United States Patent
O'Konski et al.

(10) Patent No.: US 10,754,890 B2
(45) Date of Patent: Aug. 25, 2020

(54) METHOD AND SYSTEM FOR DYNAMIC PLAYLIST GENERATION

(71) Applicants: Timothy Chester O'Konski, Palo Alto, CA (US); Masahiko Nishimura, Campbell, CA (US)

(72) Inventors: Timothy Chester O'Konski, Palo Alto, CA (US); Masahiko Nishimura, Campbell, CA (US)

(*) Notice: Subject to any disclaimer, the term of this patent is extended or adjusted under 35 U.S.C. 154(b) by 51 days.

(21) Appl. No.: 16/171,355

(22) Filed: Oct. 25, 2018

(65) Prior Publication Data

US 2019/0155840 A1    May 23, 2019

Related U.S. Application Data

(63) Continuation-in-part of application No. 14/514,363, filed on Oct. 14, 2014, now abandoned, which is a
(Continued)

(51) Int. Cl.
*G06F 16/638* (2019.01)
*G06F 16/65* (2019.01)
(Continued)

(52) U.S. Cl.
CPC ............ *G06F 16/639* (2019.01); *G06F 3/011* (2013.01); *G06F 16/436* (2019.01);
(Continued)

(58) Field of Classification Search
CPC .... G06F 3/0482; G06F 3/04842; G06F 3/165; G06F 3/04847; G06F 3/04883;
(Continued)

(56) References Cited

U.S. PATENT DOCUMENTS 8,639,706 B1    1/2014    Bilinski et al.
9,106,710 B1    8/2015    Feimster
(Continued)

OTHER PUBLICATIONS

Jurgensen, John; "An Ode to Joyful Music Streaming," Jan. 3, 2014; The Wall Street Journal; [Online] Retrieved from: http://www.wsj.com/articles/SB10001424052702304591604579290721300786680 (4 pages).

(Continued)

*Primary Examiner* — Tuyetlien T Tran
(74) *Attorney, Agent, or Firm* — Willink & Hunt LLP; Marcus T. Hunt

(57) ABSTRACT

A system and method for generating a personalized playlist is provided. A plurality of media tracks from a user device of a user is received. The plurality of media tracks is analyzed for metadata and the metadata is assigned to the media tracks in the plurality of media tracks. One or more user attributes of the user is generated. The one or more user attributes includes a first time period when the user is between 20 and 30 years old. The metadata of the media tracks is compared to the one or more user attributes. The metadata includes metadata for relevant dates of media tracks. The relevant dates include a date of performance of the media tracks and are compared to the first time period. A target mood for generating a playlist is generated. A playlist is generated based on the target mood and based on the comparison of the metadata to the one or more attributes.

21 Claims, 12 Drawing Sheets

400

| Media Track | Assigned Metadata | User Attribute | User affinity Score | |
|---|---|---|---|---|
| Song A | Relevant Dates (e.g. date of composition, date of recording, date of performance, date as hit, etc.) | Year of user's peak affinity age (e.g., year user is 25) | 10 | ←405 |
| | Relevant Dates (e.g. date of composition, date of recording, date of performance, date as hit, etc.) | User's peak generational year (e.g., 25 years before the year of the user's peak affinity age) | 5 | ←406 |
| | Cultural and geographic attributes of the media track | User's cultural and geographic influences (e.g., Country where the user lives or has lived, etc.) | 7 | ←407 |
| | keywords (e.g., tags or label as wedding or graduation playlist) | User's life events (e.g., wedding, graduation, attendance at a live music performance, etc.) | 0 | ←408 |

Related U.S. Application Data continuation-in-part of application No. 14/218,958, filed on Mar. 18, 2014, now abandoned.

(51) Int. Cl.
| | |
|---|---|
| *G06F 16/683* | (2019.01) |
| *G06F 16/635* | (2019.01) |
| *G06F 16/435* | (2019.01) |
| *G06F 3/01* | (2006.01) |
| *G06F 16/438* | (2019.01) |

(52) U.S. Cl.
CPC ........ *G06F 16/4387* (2019.01); *G06F 16/636* (2019.01); *G06F 16/637* (2019.01); *G06F 16/65* (2019.01); *G06F 16/683* (2019.01); *G06F 2203/011* (2013.01)

(58) Field of Classification Search
CPC .... G06F 16/639; G06F 16/636; G06F 16/436; G06F 3/011; G06F 16/4387; G06F 16/65; G06F 16/683; G06F 16/637; G06F 2203/011; H04L 67/10

See application file for complete search history.

(56) References Cited

U.S. PATENT DOCUMENTS

| | | | |
|---|---|---|---|
| 9,792,084 B2 | 10/2017 | Vartakavi et al. | |
| 2006/0143647 A1* | 6/2006 | Bill | G10H 1/00 |
| | | | 725/10 |
| 2006/0170945 A1 | 8/2006 | Bill | |
| 2007/0219996 A1 | 9/2007 | Jarvinen | |
| 2007/0276733 A1 | 11/2007 | Geshwind et al. | |
| 2007/0282905 A1 | 12/2007 | Karlberg | |
| 2008/0126384 A1 | 5/2008 | Toms et al. | |
| 2008/0250328 A1* | 10/2008 | Konttinen | H04L 67/02 |
| | | | 715/747 |
| 2010/0110200 A1 | 5/2010 | Lau et al. | |
| 2010/0325583 A1 | 12/2010 | Aami et al. | |
| 2011/0184539 A1 | 7/2011 | Agevik et al. | |
| 2012/0166436 A1 | 6/2012 | Kalasapur et al. | |
| 2012/0185070 A1 | 7/2012 | Hagg et al. | |
| 2014/0052731 A1 | 2/2014 | Dahule et al. | |
| 2014/0180762 A1 | 6/2014 | Gilbert | |
| 2014/0280125 A1 | 9/2014 | Bhardwaj et al. | |
| 2014/0317098 A1 | 10/2014 | Jain et al. | |
| 2014/0330848 A1 | 11/2014 | Chen et al. | |
| 2015/0058367 A1 | 2/2015 | Brüll et al. | |
| 2015/0268800 A1* | 9/2015 | O'Konski | G06F 16/4387 |
| | | | 715/716 |

OTHER PUBLICATIONS

Platt, John C., et al.; "Learning a Gaussian Process Prior for Automatically Generating Music Playlists;" NIPS'01 Proceedings of the 14th International Conference on Neural Information Processing Systems: Natural and Synthetic; Jan. 3, 2001; 1425-1432; MIT Press Cambridge, MA, USA.

Sisario, Ben; "Beats Music Streaming Service Says It Will Begin in January;" Dec. 4, 2013; The New York Times; [Online] Retrieved from: http://www.nytimes.com/2013/12/05/business/media/beats-music-streaming-service-says-it-will-begin-in-january.html (2 pages).

* cited by examiner

| Media Track 401 | Assigned Metadata 402 | User Attribute 403 | User affinity Score 404 |
|---|---|---|---|
| Song A | Relevant Dates (e.g. date of composition, date of recording, date of performance, date as hit, etc.) | Year of user's peak affinity age (e.g., year user is 25) | 10 ← 405 |
| | Relevant Dates (e.g. date of composition, date of recording, date of performance, date as hit, etc.) | User's peak generational year (e.g., 25 years before the year of the user's peak affinity age) | 5 ← 406 |
| | Cultural and geographic attributes of the media track | User's cultural and geographic influences (e.g., Country where the user lives or has lived, etc.) | 7 ← 407 |
| | keywords (e.g., tags or label as wedding or graduation playlist) | User's life events (e.g., wedding, graduation, attendance at a live music performance, etc.) | 0 ← 408 |

FIG. 4C

METHOD AND SYSTEM FOR DYNAMIC PLAYLIST GENERATION

CROSS-REFERENCE TO RELATED APPLICATIONS

This application is a continuation-in-part of application Ser. No. 14/514,363, filed Oct. 14, 2014, which is a continuation-in-part of application Ser. No. 14/218,958, filed Mar. 18, 2014, all of which are hereby incorporated by reference.

FIELD

The present disclosure relates generally to the field of media data, and more particularly to generating personalized playlists based on media data.

BACKGROUND

Heretofore consumers have had to manage their personal medial playlists actively, switch between multiple playlists, or scan through songs/tracks manually. As users' media collections grow, this can become increasingly cumbersome and unwieldy. This is because conventional playlists are static and not personalized with preset lists configured by users.

SUMMARY

In certain aspects, a system and method for generating a personalized playlist is provided. A plurality of media tracks from a user device of a user is received. The plurality of media tracks is analyzed for metadata and the metadata is assigned to the media tracks in the plurality of media tracks. One or more user attributes of the user is generated. The one or more user attributes includes a first time period when the user is between 20 and 30 years old. The metadata of the media tracks is compared to the one or more user attributes. The metadata includes metadata for relevant dates of media tracks. The relevant dates include a date of performance of the media tracks and are compared to the first time period. A target mood for generating a playlist is generated. A playlist is generated based on the target mood and based on the comparison of the metadata to the one or more attributes In certain aspects of the present disclosure, a method and system for generating one or more personalized playlists using a novel playlist generation system are provided. In certain embodiments, the playlist generation system is configured for matching customized playlists with user mood or activity levels. In an embodiment, the system can accomplish this by (1) uploading and analyzing a plurality of media tracks stored in memory of a user's device or stored at an external database via a network, (2) reading a basic set of metadata stored on the media tracks, (3) extracting an enhanced (or extended) set of metadata from the media tracks (or from portions of the media tracks), and (4) assigning classifications to the media tracks (or portions thereof) based on the enhanced set of metadata. A condition of the user can then be determined and a personalized playlist generated based on matching the condition of the user with assigned classifications of the media tracks that correspond to user conditions. The condition of the user can either be determined manually based on one or more mood selections input by the user or automatically based on biorhythmic information of the user.

In certain embodiments, the classifications can include categories of moods. Personalized playlists can be generated based on matching mood selections input by the user with mood categories assigned to the media tracks. In another embodiment, the classifications can include the pacing level of the media tracks or a combination of mood categories and pacing level of the media tracks. Personalized playlists can be generated based on matching biorhythmic data from a user with the pacing level of the media tracks.

In yet some other embodiments, a system for generating a personal playlist is disclosed. Such a system would typically include a processor, a memory coupled with the processor via one or more interconnections, such as a data and/or control bus, and a network interface for communicating data between the system and one or more networks. The system can upload a plurality of media tracks stored on the user's device, or it can access this information from a database on a network. The system can also be configured to generate and send the personalized playlists to user devices from one or more sources on the network(s).

BRIEF DESCRIPTION OF THE DRAWINGS

For a better understanding of at least an embodiment, reference will be made to the following Detailed Description, which is to be read in conjunction with the accompanying drawings, wherein:

FIG. 4C illustrates an example of user affinity data that is generated for a media track during a dynamic playlist generation process, according to an embodiment.

DETAILED DESCRIPTION

Figure 1:
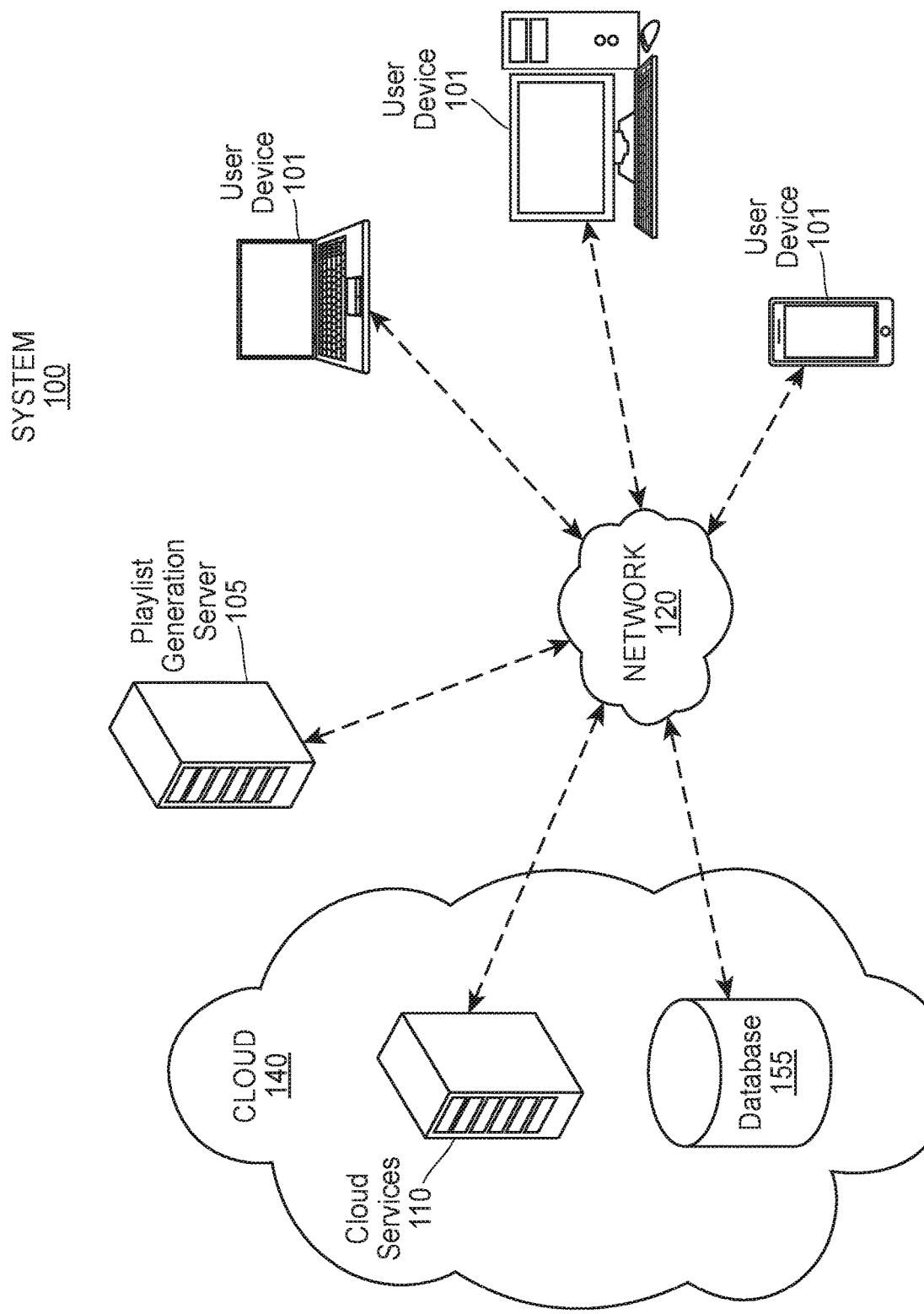
FIG. 1 illustrates a block diagram of an exemplary dynamic playlist generation system, according to an embodiment.

Before aspects of the present disclosure are described below with reference to the drawings in the description, common features may be designated by common reference numbers. Although certain examples are described herein with reference to a dynamic playlist generation method and system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect. Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

The embodiments described herein include a method and system for generating one or more customized playlists on user electronic devices. Such a playlist generation system can sit on a device or in a cloud computing server, dispensing from the cloud and connecting to other cloud services such as Amazon cloud music, etc. The playlists can be generated to match a user's mood or activity level. For example, a user may be on a long road trip and may desire to listen to some upbeat music. The system can receive this input and automatically provide a playlist geared to that user experience. In another example, when a user or group of users is on a mountain biking trip, the system can detect the activity level of the users and can provide personalized playlists to match the user activity. This playlist can further be updated dynamically as the user's activity level changes over time.

The playlist generation system is like an enhanced, targeted, custom shuffle feature. At least certain embodiments are configured to provide an algorithm that generates personalized playlists dynamically to enhance user experience based on determining user mood, location, activity level, and/or social-context. For example, the system does not want to speed you up when the user is trying to relax or slow you down when the user is trying to stay awake. The user's mood can be ascertained based on user input or other user data, and a personalized playlist adapted for that mood can be generated. In such a system, music or other media tracks can be generated and updated dynamically to adapt to a user's mood and other user parameters. Users can provide access or make available their personal media tracks collection to the playlist generation system, and the system can store personal media tracks collection data on disk or in a database in the cloud. The preferred media this system is designed for is music files (e.g., audio or video music files), but the techniques and algorithms described herein are readily adaptable to any media content including, for example, audio media, electronic books, movies, videos, shorts, etc.

In addition, the personalized playlist can be generated on the user's mobile electronic device itself or it can be generated external to the user's device and communicated to the device via a network or direct connection, such as a Bluetooth or optical network connection; or it can be communicated via both a network connection and a direct connection. For example, the media tracks and assigned classification data and basic and enhanced metadata can be stored on and accessed from a memory on the user's mobile device or via an external database. The external database can be a dedicated database or can be provided by a cloud data storage service provider.

An embodiment for generating a personalized playlist includes uploading and analyzing a plurality of media tracks stored in memory of a user's device or stored at an external database via a network, reading a basic set of metadata stored on the media tracks, extracting an enhanced (or extended) set of metadata from the media tracks (or from portions of the media tracks), and assigning classifications to the media tracks (or portions thereof) based on the basic and enhanced sets of metadata. The condition of the user can then be determined and a personalized playlist can be generated therefrom based on matching the condition of the user with assigned classifications of the media tracks that correspond to user conditions. The condition of the user can either be determined manually based on one or more mood selections input to the user's device or automatically based on biorhythmic information of the user. Users can also select between the manual and automatic modes of operation.

In an embodiment, the classifications include categories of moods. The personalized playlist can be generated based on matching the mood selections of the user with the mood categories assigned to the media tracks. The mood categories can be pre-configured in the system. In addition, a group of moods can be selected and a playlist can be generated based at least in part thereon. The list of mood categories can include, for example, aggressive, angry, anguish, bold, brassy, celebratory, desperate, dreamy, eccentric, euphoric, excited, gloomy, gritty, happy, humorous, inspired, introspective, mysterious, nervous, nostalgic, optimistic, peaceful, pessimistic, provocative, rebellious, restrained, romantic, sad, sexy, shimmering, sophisticated, spiritual, spooky, unpredictable, warm, shadowy, etc.

In another embodiment, the classifications can include a pacing level of the media tracks or a combination of mood category and pacing level of the media tracks. The speed of a media track or portions thereof can be represented as a numeric biorhythmic index representing the media track numerically. The personalized playlist can then be generated based on matching biorhythmic data from a user with the pacing level of the media tracks. The pacing level can be a numeric biorhythmic number index for the media track or portion thereof—it can be another way of representing a media track numerically. A numeric value associated with biorhythmic data received from the user can be matched to the biorhythmic number index for the media tracks and a playlist can be generated therefrom.

The biorhythmic data can be obtained from the user's mobile device or from an electronic device configured to detect user biorhythmic data, or from both. For example, popular today are wearable electronic devices that can be used to detect user biorhythmic data such as pulse, heart rate, user motion, footsteps, pacing, respiration, etc. Alternatively, applications running on the user's mobile device can be used to detect user biorhythmic data, or combination of wearable electronic devices and applications running on the user's mobile device. Many mobile devices these days include several sensors adapted to receive user biorhythmic information.

The system is further configured for receiving user preferences information or user feedback information and generating a personalized playlist based at least in part thereon. The system can also harvest user listening history and use that information for generating the personalized playlists. For instance, the favorite or most frequently played media tracks of a user, or skipped track information can be used in generating playlists. In addition, mood information can also be harvested from one or more social media connections of a user and used to generate playlists. Social media sentiment of the user's connections can also be used. The personalized playlists can also be generated based at least in part on averaging mood information of social media contacts of the user.

The set of basic metadata contains basic categorizations about a media track and is typically stored on and/or associated with media tracks for indexing into the tracks. This basic metadata generally includes some combination of track number, album, artist name, name of track, length of track, genre, date of composition, etc. The set of enhanced or extended metadata, on the other hand, is generally not stored on or associated with the media tracks, but can be added to the basic metadata. The enhanced metadata can be extracted from the media tracks or portions thereof. This enhanced set of metadata can include, for example, relevant dates (e.g., date of composition, date of recoding, date of performance, date as a hit, etc.), instrumentation, mood category, pacing level, start and stop time of portions of the track (referred to herein as "movements"), cultural and geographic attributes of the media track (e.g., Christmas music or German music), etc. This enhanced metadata can be used to generate one or more personalized playlists for users. The enhanced metadata can also be used to associate, for example, a date of performance with a social timeline of user experience. It should be appreciated that the date of composition, date of recoding, date of performance, date as a hit are industry terms that are associated with the musical material (e.g., musical recording or live musical recording) of the media track. For example, a media track can include music (or a song, live musical performance or concert, etc.) from a musical artist or group. The date of composition refers to the date the music was composed by a composer. The date of recording refers to the date the recording session took place to record the music. The date of performance refers to the date the music was performed live by the musical artist or group. For example, the date of performance for a media track with a live concert performance is the actual performance date (e.g., dd/mm/yyyy) of the live concert by the musical group. The date as a hit refers to the date the music was a top hit based on sales, radio time, streaming activity, or any other popularity ranking. These top hits can be provided by various entities, such as the recording or music industry, or other organization. The top hits can be representative of different groups or demographics, such as a nation, country, etc.). The media tracks can be referenced against one or more databases of top hits to determine if the media track is a top hit, for example.

In certain aspects, a personalized playlist is generated specific to the user and the user's collection of personal media tracks. For example, the playlist generator can generate a personalized playlist by selecting songs only from the user's personal media tracks collection. The playlist generator can receive the user's personal media tracks collection from memory on the server, or from being uploaded from a user device of the user, for example. The media tracks can be analyzed to determine metadata that can be assigned to the media tracks, such as the basic track metadata stored on the media track and extracted enhanced metadata described herein. The metadata can include, for example, mood category, pacing level, relevant dates (e.g., date of composition, date of recording, date of performance, date as a hit media track, etc.). The metadata can include keywords (e.g., hashtags, labels, tags, word descriptions, titles of the track or movement, etc.) that the user has used to describe aspects to one or more media tracks can be identified and assigned to media tracks. New or additional metadata can be generated from existing metadata. For example, mood metadata for a media track can be determined from analyzing existing metadata (e.g., keywords). In an embodiment, synonyms can also be generated for keywords (or phrases) and added as additional metadata. In an embodiment, keywords (or phrases) that are suggestive of moods, meaning, imagery, etc. can be stored as metadata assigned to media tracks, and in such case synonyms can also be generated to provide alternative words as metadata that describe the suggestive mood, meaning, imagery, etc. For example, the term "tear jerker" can be metadata used to describe a media track, and synonyms such as "cry" or "sad" can be saved as metadata for the media track. The synonyms generated can are not limited to mood and can include other types of metadata. For example, "racing" can be metadata that is somewhat descriptive of the sound, feel, or mood of the media track, and a synonym such as "fast" can be stored as metadata related to the tempo.

In one embodiment, hashtag mood terms that are used to express the moods of a specific track in the users collection can be utilized. For example, the playlist generator can use exact matches and a thesaurus mechanism to determine a possible list of songs to incrementally attain the target (or desired) mood. Example methods of linking metadata to mood can include: providing predetermined links between various metadata (e.g., genres, instrumentation, tempo, date of performance, etc.) and one or more moods; receiving user input as to what moods are connected to the metadata; crowdsourcing links between metadata and moods; etc. Many times a musical track can include different renditions or versions performed by one or more artists. The different renditions can vary in style, tempo, genre, etc., and can thus be linked to different moods. These links between date of performance and moods can be maintained in a database, for example, and accessed when a mood determination is to be made.

The metadata can also include user affinity data that is generated for the media tracks. The user affinity data can include a user attribute and a user affinity score. The user attribute is an attribute of the user that can provide an indication that the user may have an affinity for certain types of media tracks. Example user attributes include a user's age, a user's peak affinity age, a user's peak generational year, a user's life events, a user's geographic or cultural influences (e.g., where the user currently lives or has lived, etc.), etc. The user's life event refers to any event that the user has experienced during his lifetime, such as wedding, graduation, attendance at a live musical performance, etc. It can be determined, for example, by analyzing the user's social media timeline, which can indicate events the user has attended. A user affinity score for a media track is computed by comparing a user attribute to any relevant metadata that is assigned to the media track. The user affinity score represents a likelihood that the user has an affinity for the media track based on how well any assigned metadata matches with the user attribute.

The user's social media can also be harvested (or analyzed) to determine and assign metadata related to media tracks. For example, the user's social media data (e.g., the social media data related to the user and the user's social connections) can be harvested (or scraped) to determine and assign metadata for one or more media tracks. For instance, keywords (e.g., hashtags) that the user has used to describe one or more media tracks can be identified and assigned to media tracks. Synonyms can also be generated for the keywords and also added as metadata. For example, hashtags words that the user has used to describe the mood of a media track can be harvested to assign to the media track. User attributes can also be harvested from the user's social media to generate user attribute data and corresponding user affinity scores. Data indicating user activity, user location, user presence, user social context, etc. can also be harvested from the user's social media data.

Generating the user attribute data can include computing the user's peak affinity age, computing the user's peak generational year, determining the user's cultural and geographic influences, and determining the user's life events, for example. The user attributes can be generated from social media data, as previously described, and can also be generated from direct user input from the user. The user attributes can then be compared to metadata that is assigned to each of the media tracks to determine if a match exists (or to what degree a match exists). In an embodiment, synonyms can be generated and added as metadata for keywords of the metadata, and synonyms can also be generated for keywords of the user attributes. The user affinity scores corresponding to each of the user attributes are computed and can be saved as additional metadata assigned to the corresponding media tracks.

In certain aspects, the user affinity score is generated to represent the likelihood that the user has an affinity for a media track or a group of media tracks, such a genre of the media tracks. It should be appreciated that the term "score" is used broadly herein and may include numerical values (e.g., 1 to 10), symbolic values (e.g., 1 to 5 stars), weightings (e.g., scalar values), etc. The score can also include a binary value, such as 0 or 1, star or no star, etc. Furthermore, the numerical values and symbolic values can also include negative values, which can represent a user "dislike" of one or more media tracks. While weightings are traditionally only positive, it should be appreciated that in another embodiment, the weightings can be negative.

Figure 4A:
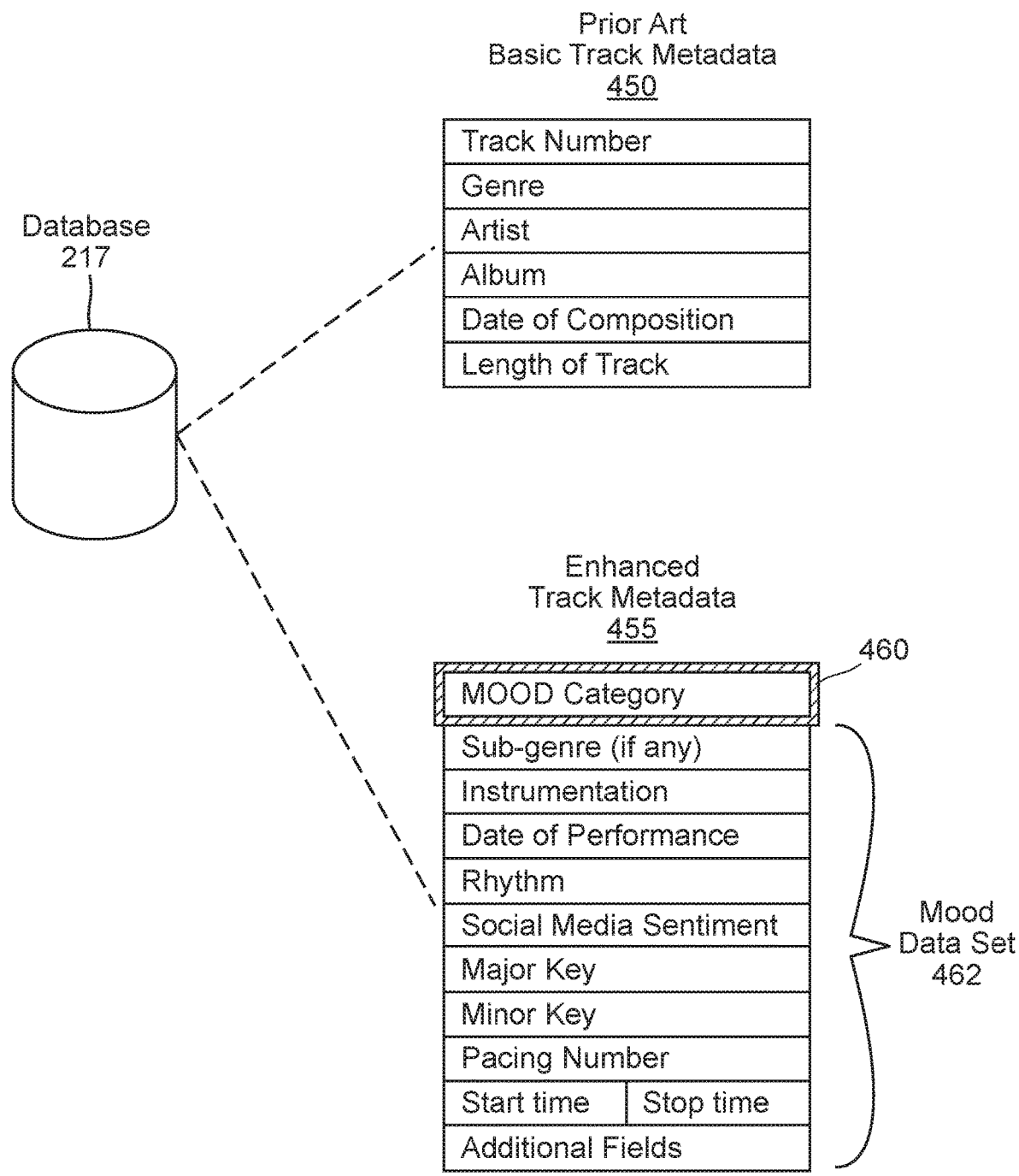
FIG. 4A illustrates metadata being extracted from a media track during a dynamic playlist generation process, according to an embodiment.
Figure 4B:
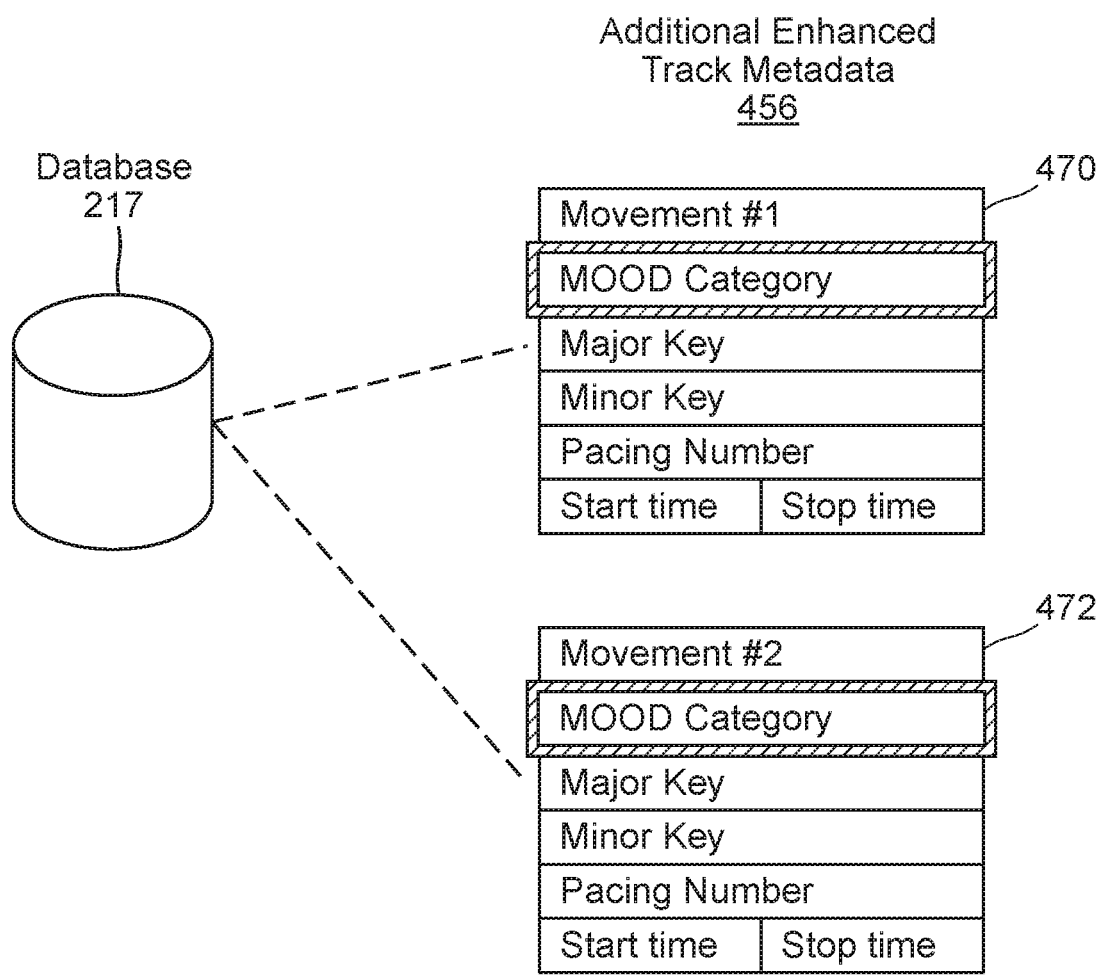
FIG. 4B illustrates metadata being extracted from a portion of a media track during a dynamic playlist generation process, according to an embodiment.
Figure 4D:
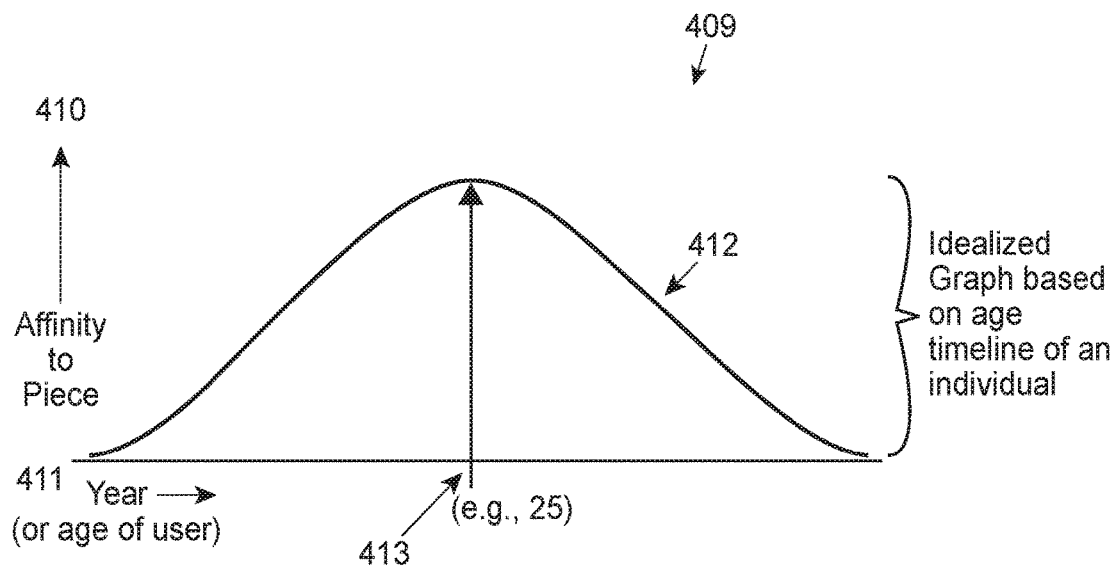
FIG. 4D illustrates a graph of an example user maturity arc, according to an embodiment.
Figure 4E:
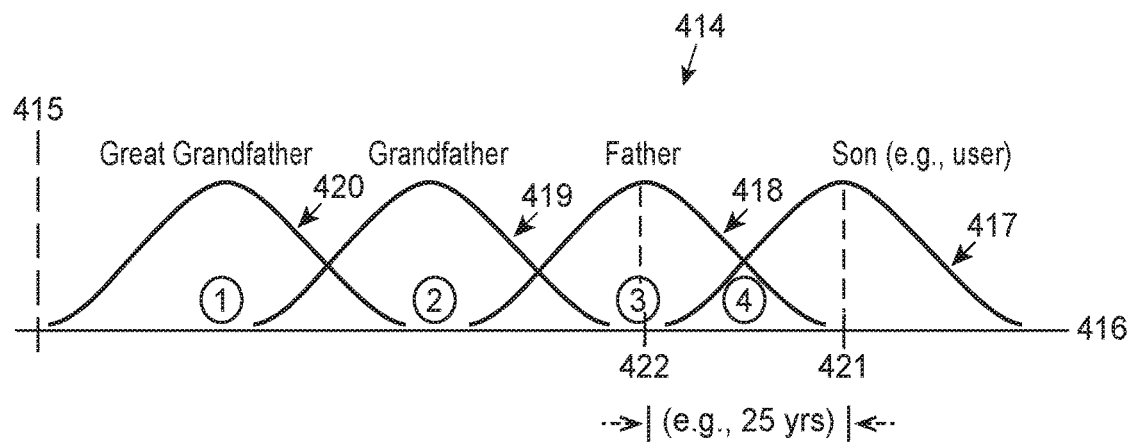
FIG. 4E illustrates a graph of an example user maturity arc as well as prior generational maturity arcs, according to an embodiment.

The user affinity data can relate to a peak affinity age of the user (e.g., as determined from a user's maturity arc, such as shown and further described in FIGS. 4C-E). The peak affinity age of the user represents the age in which the user has the strongest impressions to music and most likely to have a strong affinity for music. This can be based on various factors, such as the brain development maturity, which can affect a person's musical appreciation development. The user's affinity for music decreases as the age of the user gets further away from the peak affinity age. Once the peak affinity age of the user is determined, the time period (e.g., calendar years) corresponding to the user's peak affinity age can be determined. In an embodiment, the peak affinity age of the user is determined to be between 20 and 30 years old and the time period (e.g., calendar years) corresponding to the user's ages from 20 to 30 can be computed. When selecting media tracks for a playlist, the media tracks with relevant dates (e.g., date of composition, date of recoding, date of performance, date as a hit, etc.) within the time period can be scored or weighted so as to reflect greater user affinity for those media tracks. For example, if the time period corresponds to years 2000 to 2010, then the media tracks with relevant dates between 2000 and 2010 can be scored or weighted to reflect a greater user affinity for those media tracks. In another embodiment, the time period corresponds to a single year between the ages of 20 and 30 years old, such as 25. In such case, for example, if the time period corresponds to the year 2005, then the media tracks with relevant dates of 2005 can be scored or weighted to reflect a greater user affinity for those media tracks. In an embodiment, relevant dates can be scored or weighted so as to reflect a decreasing user affinity for media tracks with relevant dates increasing in time away from the time period. This weighting can also be applicable to other date related metadata, such as cultural or geographic attributes, temporal attributes (e.g., season of the year), etc.

The user affinity data can include user affinity data related to the user's peak generational year, which corresponds to a time period prior to the time period corresponding to the peak affinity age of the user. The peak generational year can be determined from maturity arcs of the user and at least the prior generation, such as shown and further described in FIGS. 4C-E). The user's peak generational year represents a time period in which the user may have an outlying increase in impressions to music due to generational influence (e.g., the influence of music played by parents, which is likely to include music dated to the peak period of their generation's maturity arc). In an embodiment, the peak generational year is determined to be between 20 and 30 prior to the time period corresponding to the user's computed peak affinity age. When selecting media tracks for a playlist, the media tracks with relevant dates (or other date related metadata) that are within the peak generational year can be scored or weighted so as to reflect increase in user affinity for those media tracks. For example, if the user's peak affinity age corresponds to the year 2000 and the peak generational time period is 20-30 years prior (i.e., 1970 to 1980), then the media tracks with relevant dates of between 1970 and 1980 can be scored or weighted to reflect an outlying increase in user affinity for those media tracks. In another embodiment, the peak generational year corresponds to a single year between 20 and 30 years prior, such as 25 years prior. In such case, for example, if the user's peak affinity age corresponds to the year 2000 and the peak generational year is 25 years prior, then the media tracks with relevant dates in 1975 can be scored or weighted to reflect an outlying increase in user affinity for the media tracks. In an embodiment, media tracks with date related metadata outside the peak generational year can be scored or weighted so as to reflect a decreasing user affinity for media tracks with relevant dates increasing in time away from the peak generational year.

The user affinity data can relate to life events, cultural attributes, and geographical attributes, which can be directly input by the user or harvested from social media related to the user, for instance. For example, life events can include events that the user experienced in the past, such as weddings, graduation, birth of a child, live musical performances, etc. This information can be obtained from a social media timeline of the user, or from direct input from the user, for example. Media tracks with metadata related to the user's wedding or graduation (e.g., labeling as part of a wedding or graduation playlist) can be scored or weighted to reflect a greater user affinity for those media tracks. The cultural and geographical influences can include cultures and geographic locations that are related to the user or the user's life, for instance. For example, if the user's social media timeline has shown that the user currently lives in Germany (or previously lived in Germany), then the media tracks with metadata related to Germany (e.g., German music) can be scored or weighted so at to reflect a greater user affinity for those media tracks. If the user's social media indicates that the user has used positive keywords (e.g., hashtags) to describe or comment on Irish music, then the media tracks with metadata related to Irish music can be scored or weighted so at to reflect a greater user affinity for those media tracks.

In some cases, multiple user affinity scores can be assigned to a single media track. For example, a single media track can have a user affinity score for itself, as well as two more scores for its genre and pacing level. In an embodiment, a total user affinity score can be generated based on the applicable user affinity scores, such as by using a weight sum. For instance, the three user affinity scores can be summed, with the score for the single media track itself weighted more heavily to reflect a stronger consideration than the score for genre or pacing level.

The playlist generator unit is adapted to determine a condition of the user and to generate a personalized playlist based on the user's condition. The condition of the user is either determined manually based on a mood selection or group of mood selections input by the user, or can be determined automatically based on user biorhythmic information. The system can also include comparator logic configured to match the mood selections of the user with the mood categories assigned to the media tracks. The comparator logic can also be configured to match biorhythmic information of the user with the pacing level assigned to the media tracks as discussed above.

In an embodiment, after configuration and authentication, the user can make one or more mood selections and those selections can be input into the playlist generator unit. In addition, the user may choose to reveal his or her location, presence, social context, or social media context. The system can generate a playlist for one or more media players, which in turn can be configured to play the received media. The techniques described herein are not limited to any particular electronic device or media player associated therewith. Further, the playlists can be of variable length (as desired or selected by users) and can take into consideration one or more of the following: (1) user mood; (2) user location (contextual e.g. in a car, or physical e.g. "5th and Jackson Ave in San Jose, Calif. USA"); (3) user presence (what condition the user is in from other devices stand-point, e.g. in a conference call); or (4) user social context or social media context (what the user's social media connections are doing).

The media tracks can also be broken down into portions or "movements." This can be done in circumstances where a different mood or pacing level is assigned to different sections or "movements" of the media track. There could be one speed (pacing) throughout a single media track or it could change throughout the track. It could be divided up into multiple movements within a track with multiple corresponding start and stop times, each movement represented by a pacing number. In such cases, the personalized playlists may include media tracks, movements, or both media tracks and movements intermixed and assigned to a particular playlist based on mood category and/or pacing level.

The system can also have an advanced mode whereby users can choose to create an algorithm where music is selected based on any a predetermined musical criteria similar to what a human disc jockey might choose at an actual event. In addition, the system can customize the generated playlists. For example, tempo, vitality, or era corresponding to a user's age or cultural background can be used to enhance the playlist for a specific occasion or location of listeners. Online advertisements can also be targeted based on the mood of the user ascertained by the system.

FIG. 1 depicts an example block diagram of an embodiment of a dynamic playlist generation system with an external playlist generator 105. In the illustrated embodiment, system 100 includes an external playlist generation server 105 in communication with one or more user devices 101 via one or more networks 120. Playlist generation server 105 can be any network computer server as known in the art. Playlist generation server 105 can perform the techniques described herein by itself or in combination with one or more cloud services 110. The playlist generation server 105 can further be a standalone server or can be an array of connected servers working in combination to generate personalized playlists according to the techniques described herein. Playlist generation server 105 can access a database 155 for storage and retrieval of user tracks, classifications of the tracks, and/or basic or enhanced metadata associated with the media tracks. Database 155 can also be adapted to store user profile information, user preferences, user listening history, as well as the social media connections of users.

Figure 2:
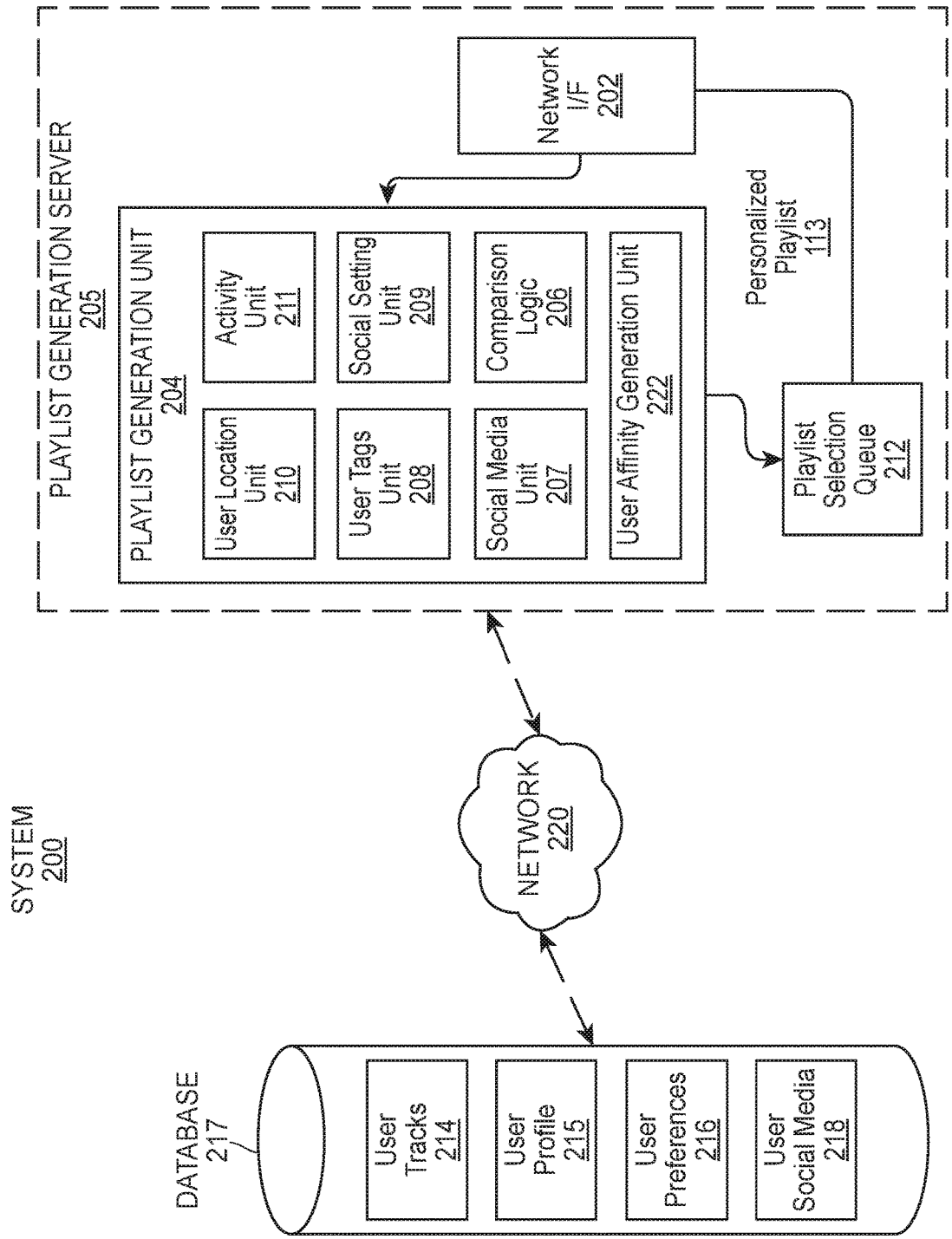
FIG. 2 illustrates a block diagram of an exemplary dynamic playlist generation system, according to an embodiment.

FIG. 2 depicts an example block diagram of a more detailed embodiment of a dynamic playlist generation system. System 200 includes a playlist generation server 205 in communication with one or more databases 217 via one or more networks 220. In an embodiment, the playlist generation server 205 performs the techniques described herein by interacting with an application stored on user devices (see FIG. 1). In another embodiment, the playlist generation server 205 can be a web server and can interact with the user devices via a website. Playlist generation server 205 may present users with a list of all mood keywords that are available so the user can pick the ones that are of interest. Users can also select groups of moods. Playlist generation server 205 communicates with the user devices and database 217 via one or more network interfaces 202. Any network interface may be used as understood by persons of ordinary skill in the art.

In the illustrated embodiment, playlist generation server 205 includes a playlist generation unit 204 containing on or more algorithms to generate customized playlists that are based on user data and personalized media preferences. Playlist generation unit 204 can be configured to receive user media tracks and other user information from the user devices and to provide personalized playlists to the user devices via the network(s) 220 using the network interface 202. The playlist generation unit 204 includes, and receives inputs from, one or more of the following units: (1) a user location unit 210, (2) a social setting unit 209, (3) an activity unit 211, (4) a user tags unit 208, and (5) a social media unit 207. The playlist generation unit 204 is also shown including a user affinity generation unit 222. The user affinity generation unit 222 can be used to generate the user affinity data (e.g., the user attributes and the corresponding computed user affinity score, such as shown in FIGS. 4C-E and 6. The playlist generation unit 204 provides outputs, based on one or more algorithms, to a playlist selection queue 212 for outputting the personalized playlists to the user devices. Outputs from the playlist generation unit 204 can include a targeted playlist for use on the user's device(s), an aggregation of songs from the user's current device, and any recommendations from social media connections of the user. Further queue 212 can be tuned to social setting, location, and activity of the user. The user can select (or not) media tracks such as types of music, e.g., classical, popular, jazz; and can select depending on one or more tuning categories.

The playlist selection queue 212 can then output a targeted playlist to the users' devices according to all the aforementioned inputs from units and database 217. This playlist can be temporal, including user favorites and weights of each output, time of play, as well as the additional ability to ramp up or down depending on settings configured by the user. Stored media from the user's device can then be provided to the database 217. In an embodiment, the stored memory of the user device, which can then be fed back into a database 217. System 200 enables user device to access the stored media and to play the targeted playlist. Playlist generation unit 204 also includes comparison logic 206 for comparing values of the mood selections by users with the mood categories assigned to the user's media tracks. Comparison logic 206 can also be configured to compare values of user biorhythmic data with the pacing level assigned to the user's media tracks or portions thereof. The comparison logic 206 can also be configured to perform comparison operations for the user affinity generation unit 222, such as comparing assigned metadata to user affinity data, etc.

The system can further include a user location unit 210 adapted to determine the user's location based on location information received from the user's device. For example, a Global Positioning System ("GPS") device located on the user's mobile device can be used to determine the user's geographic location, and this information can be further used by the system to assist in generating one or more personalized playlists of media tracks for the user. Such location information can include, for example, driving (short trip or long trip), walking, at home, in the office, on public transit, at breakfast, etc.

In the illustrated embodiment, the playlist generation unit 204 can includes an activity unit 211 configured to ascertain the activities or activity level users are engaged in based on user biorhythmic information. Activity unit 211 can include the user's current activity in the location of the user including, for example, walking, driving, jogging, etc. This information can be provided by inputs to the user's device such as motion detectors, GPS devices, etc. If the user's heart rate is very high, the system may determine the user is engaged in physical exercise. This information can be combined with other information and used when generating personalized playlists. User historical data can also be combined with the biorhythmic data to provide enhanced information regarding the user's biorhythmic data and activity level.

The playlist generation unit 204 can also include a user tags unit 208 to receive user tags and use them to generate playlists in combination with other factors. Users tags include user feedback to the system over time such as which media tracks the user has selected as well as current user favorites. The system is dynamic so it allows for new user tagging. Users can add or remove media tracks from a playlist, give a certain media track a "thumbs up," etc.

A social media unit 207 can also be included in the playlist generation unit 204 to harvest information relating to the user's social media connections and can use that information when it generates customized playlists. Social media unit 207 can include social media content from various sources such as Google+, Facebook, Linkedin, public cloud playlists, etc. Social sentiment can be harvested such as in the form of hash tag words from a user's social media feed, such as "# Thisiscool," etc. This information can be used to enhance the personalized playlists generated by the system. The system takes into consideration a user's social graph, and harvests mood information from those connections at each point in time. A selection tab can be provided to select the user's mood selections alone or a combination of the user's mood selections and the mood selections of groups of social media connections in the user's social graph. In such cases, a group playlist can be generated. Groups are customizable within a social network. A social setting unit 209 can also be included in the playlist generation unit 204 and used to make determinations as to the user's social setting based on user information provided by the user devices. A users social setting can include, for example, working, taking a coffee break, alone, with friends, at a wedding, etc. This information can also be used in combination with other information to generate the personalized playlists.

In the illustrated embodiment, the playlist generation unit 204 in the playlist generation server 205 is in communication with a database 217. Database 217 can be a meta-content database adapted to store the user's media tracks 214 and additional user data such as user profile information 215, user preferences 216, and user social media data 218. Database 217 can include content the user has interacted with, both on and off the system 200, as well as content the user's friends have interacted with. In an embodiment, database 217 is an external database as shown. In alternative embodiments to be discussed infra, the playlist generation unit 204 can be located on the user device and the user tracks 214 and other user information can be stored in a memory of the user devices. In such a case, the memory on the user device performs the same functionally as database 217, but does so internally to the user device without connecting to a network. Regardless of where located, the data stored includes the user's media tracks 214 along with the basic and enhanced metadata and the classifications information of the media tracks. The database 217 therefore contains the enhanced information about each of the user's media tracks.

Database 217 (or user device memory) can also store user profile information 215 such as, for example, user name, IP address, device ID, telephone number, email address, geographic location, etc. User profile information 215 can include authentication and personal configuration information. User preferences information 216 and user social media 218 can also be stored in database 217. User preferences information 216 can include, for example, user listening history, skipped track history, user tags, and other user feedback about media tracks, etc. User preferences data can be located anywhere, on a smartphone or in database, and can be harvested. User preferences data could also reside on the user's smartphone and then moved to the cloud or other network, for example, and a song could be repeated because the user indicated he or she liked it. When user preferences are received, they can be moved up into the cloud and aggregated and modified over time. User social media information 218 can include, for example, a user's social media connections, social media sentiment, etc.

System 200 can be comprised of several components including the components depicted in FIG. 2 above. System 200 can further include the following optional components: (1) a contextual parameter aggregator unit configured to collect and aggregate user data; (2) a data analytics unit to determine the efficacy of the media track data to improve the playlist generation algorithm over time; or (3) a music database interface including a web interface to allow users to manually input information to improve media track data.

Figure 3:
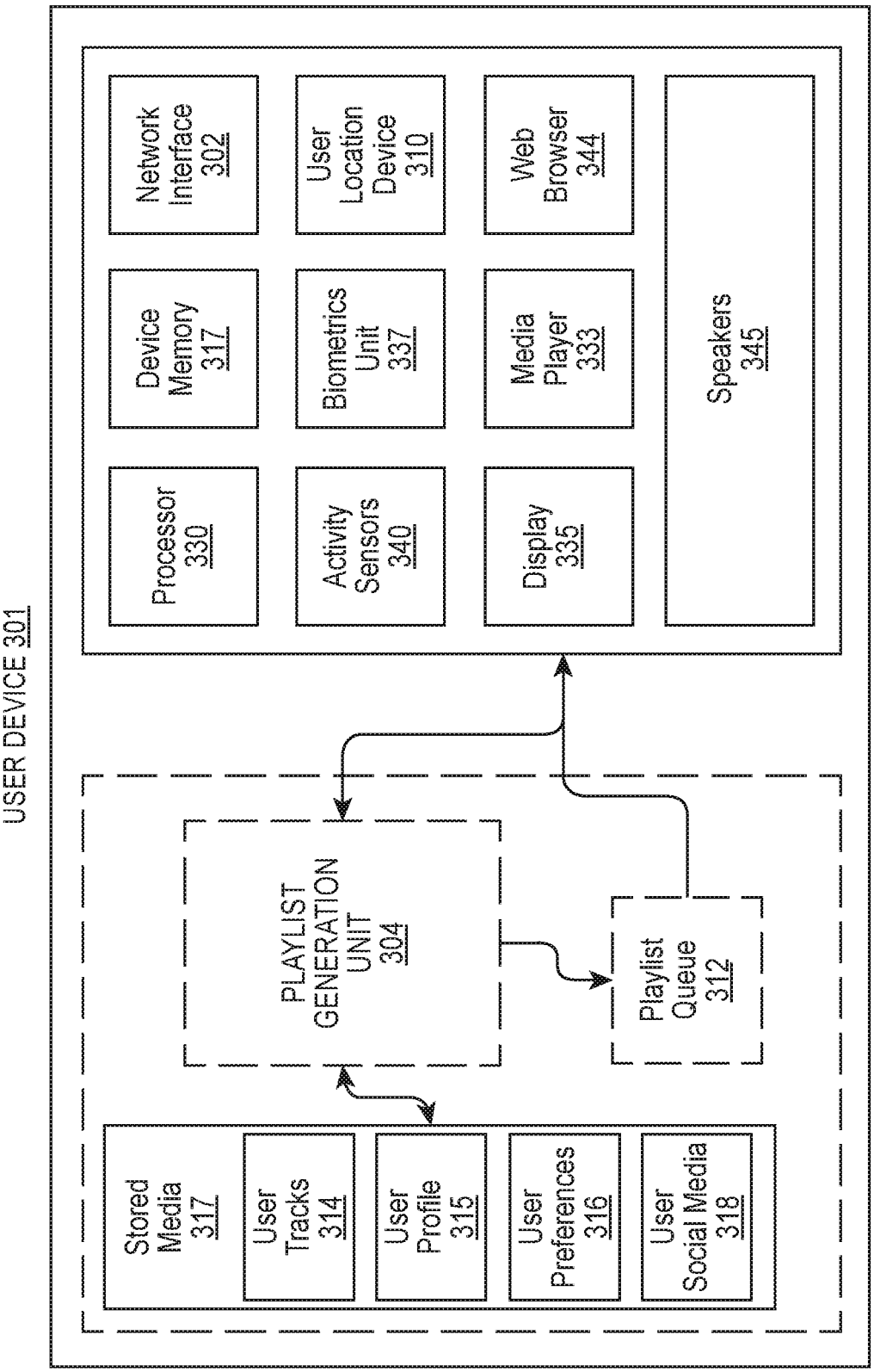
FIG. 3 illustrates a block diagram of an exemplary user device for use with a dynamic playlist generation system, according to an embodiment.

FIG. 3 depicts an example block diagram of an embodiment of a user device for use with a playlist generation system that performs the techniques described herein. In the illustrated embodiment, user device 301 includes customary components of a typical smartphone or equivalent mobile device including a processor 330, device memory 317, one or more network interfaces, a user location device 310 such as a GPS device, a media player 333, a web browser 344, a display 335, and speakers 345. Such components are well known in the art and no further detail is provided herein.

User device 301 can further include activity sensors 340 and a biometrics unit 337. User device 301 may include, for example, motion sensors, orientation sensors, temperature sensors, light sensors, user heart beat sensors, user pulse sensors, respiration sensors, etc. This output data can be used to determine the activity or activity level a user is engaged in. Alternatively, a user may possess one or more wearable electronic devices configured to collect and transmit user biorhythmic and activity information to the user device 301 via a network or direct connection such as a Bluetooth connection. Biometrics unit 337 is configured to collect this user biorhythmic and activity information output from one or more activity sensors 340 and to provide this information to the playlist generation unit 304. The biometrics unit 337 can be a dedicated unit configured in computer hardware or combination of hardware and software. Alternatively, the biometric unit 337 can be an application running on the user device 301 and integrated with one or more electronic devices configured to detect user activity levels.

In an embodiment, the playlist generation unit is external to the user device 301 and can be accessed via one or more networks as described above with respect to FIG. 2. In the illustrated embodiment of FIG. 3, the playlist generation unit 304 is located on the user device 301. The playlist generation unit 304 can be a dedicated hardware unit or combination of hardware and software; or it can be a software platform stored in device memory 317 of the user device 301. As shown, playlist generation unit 304 is coupled with an output playlist queue 312 for providing personalized playlists that can be displayed using a media player 333 and output to a display 335, speakers 345, or other output device of the user device 301. Playlist generation unit 304 is further coupled with the user information 314 through 318 as before, but in this case, the user information 314-318 is located in one or more of the device memories 317 of the user device 301. Any combination of user information 314-318 can be stored on the memory 317 of the user device or on an external database 217 accessible via one or more networks.

FIG. 4A depicts an example embodiment of metadata extracted from a media track during a dynamic playlist generation process. In the illustrated embodiment, database 217 (or equivalently memory 317 of FIG. 3) stores both the basic media track metadata 450 and the enhanced media track metadata 455. The basic metadata is typically stored with the media tracks. In an embodiment, the enhanced metadata is extracted from the media tracks and can be added to the basic metadata of the tracks. In this way, the enhanced metadata is extended metadata. In other embodiments, the enhanced metadata can be stored with the corresponding media tracks and need not be explicitly added to the basic metadata.

The basic track metadata 450 can include track number, track length, artist, song name, album, date of composition, genre, etc. The enhanced track metadata 450 is extracted from the media tracks and from the basic metadata and includes one or more mood categories 460 and a mood data set 462. The mood data set 462 can include pacing number, sub-genre, instrumentation, date of performance, rhythm, major key, minor key, social media sentiment, as well as start and stop times for any movements. In an embodiment, the mood categories are determined based on an algorithm with the mood data set 462 as its inputs. The system is expandable to allow additional fields to be added over time as well. These additional fields may be generated based on historical user information ascertained over time. Further, the additional metadata fields can be of variable length so new information can be added from ingesting social media content or other user feedback or preferences. This basic and enhanced metadata can be used by the dynamic playlist generation system when generating one or more personalized playlists for users.

FIG. 4B depicts an example embodiment of metadata extracted from a portion of a media track during a dynamic playlist generation process. As described above, media tracks can be further subdivided into movements to account for changing mood categories and pacing level within a single media track. In such a case, a plurality of movements can be defined within the media track. Each movement will be associated with a mood category and pacing level in the same way an entire media track is classified according to the discussion above. Any number of movements may be defined within a media track. In the illustrated embodiment, database 217 or memory 317 includes additional enhanced track metadata 456 that is be broken down into movement #1 470 and movement #2 472. This information includes the same (or more or less) information as contained in the enhanced metadata 455 of FIG. 4A. This additional enhanced metadata can be used by the dynamic playlist generation system when generating one or more personalized playlists for users. In this case, though, the playlist may include one or more movements of tracks or may contain movements of tracks intermixed with complete tracks and categorized according to mood selection or user biorhythmic data.

FIG. 4C depicts an example embodiment of user affinity data generated for a media track during a dynamic playlist generation process. A table 400 is shown including a media track in column 401, assigned metadata in column 402, user attributes in column 403, and user affinity scores in column 404. While only data for a single example media track (e.g., Song A) is shown in columns 401, 402, 403, and 404, it should be appreciated that additional media tracks can be includes, such as all the user's media tracks.

The user affinity data referred to herein can include the data in the user attributes column 403 and the user affinity scores column 404. In an embodiment, the user affinity data is generated and represents the likelihood that the user has an affinity for the media track in column 401 based on matching the user attribute in column 403 to the assigned metadata in column 402. The user affinity score in column 404 can be computed to reflect the degree (or level) of likelihood that the user has an affinity for the media track in column 401. For example, in an embodiment, a high score (e.g., 10 out of 10) in column 404 can reflect a high likelihood that the user has an affinity for the media track in column 401; a low score (e.g., 5 out of 10) in column 404 can reflect a small likelihood that the user has an affinity for the media track in column 401; a 0 or negative score in column 404 can reflect a likelihood that the user has a dislike (or negative affinity) for the media track in column 401. In one embodiment, larger negative scores represent higher likelihoods that a user dislikes the media track, or in another embodiment, that the user has a higher degree of dislike for the media track.

The user attribute in column 403 can include various user attributes, such as attributes related to a user's peak affinity age (e.g., as shown in row 405), a user's generational time period (e.g., as shown in row 406), a user's cultural and geographic influences (e.g., as shown in row 407), and a user's life events (e.g., as shown in row 408).

In the example shown in row 405, the user's peak affinity age in column 403 can be determined from the user's current age, which can be determined based on direct user input, harvested social media data for the user (e.g., listed birthdate, etc.), etc. Once the user's current age is determined, the user's peak affinity age can be computed based on the user's maturity arc, such as shown in FIG. 4D. FIG. 4D depicts an example graph 409 plotting the user's affinity for music 410 over the age of the user 411, which is represented by line 412 in the general shape of a bell curve. A peak affinity age 413 is shown as age 25 and corresponds to the peak of the bell curve when the user's affinity is greatest. In another embodiment, the peak affinity age can be a range, such as example ranges of ages 20 to 30, including ages 22 to 28. Returning to FIG. 4C, once the user's peak affinity age is computed, the year (or time period) corresponding to this age can be computed and used to determine if a match exists with the assigned metadata in column 402. Any relevant dates (e.g., date of composition, date of recording, date of performance, date as a hit, etc.) in column 401 that are assigned to the media track in column 401 can be compared with the year corresponding to the user's peak affinity age. A user affinity score in column 404 can be computed based on how closely one or more of the relevant dates in column 402 are to the year of the peak affinity age in column 403. For example, an example high score of 10 (e.g., on a scale of 1-10) is shown in column 404 to represent that the media track has a relevant date in column 402 that resides in the year of the peak affinity age in column 403.

In the example shown in row 406, the user's peak generational year in column 403 can be computed by first computing the year corresponding to user's peak affinity age, such as described for the example in row 405. Then, the user's peak generational year in column 403 can be computed based on the user's maturity arc and prior generation's maturity arc, such as shown in FIG. 4E. FIG. 4E depicts an example graph 414 plotting a user's affinity for music 415 with respect to time (in years) 416. The graph 414 includes the maturity arc 417 of the user and the maturity arcs 418, 419, and 420 of the three prior generations' to the user. In the embodiment show, only maturity arcs 417 and 418 are used to compute the peak generational year. The peak generational year occurs a time period prior to the year of the user's peak affinity age, and the time period is equal to the number of years between the maturity arcs 417 and 418 (e.g., the years the peaks of the two arcs 417 and 418). In the embodiment shown, the user's generational time period is 25 years and corresponds to a peak generational year that is 25 years prior to the year of the peak affinity age of the user. In another embodiment, the user's generational year can be a range, such as example ranges of ages 20 to 30, including ages 22 to 28 prior to the year of the user's peak affinity age. Returning to FIG. 4C, the user's peak generational year in column 403 can be compared with the assigned metadata in column 402 to determine if a match exists. For example, the relevant dates in column 402 assigned to the media track "Song A" in column 401 can be compared to the user's peak generational year. A user affinity score in column 404 can be computed based on how closely one or more of the relevant dates in column 402 are to the user's peak generational year in column 403. For example, a score of 5 (e.g., on a scale of 1-10) is shown in column 404 to represent that the media track in column 401 has a relevant date within the user's peak generational year in column 402. The user affinity score in row 406 (e.g., 5) related to the peak generational year is smaller than the user affinity score in row 405 (e.g., 10) related to the user's peak affinity age to reflect that peak affinity age of the user is more strongly weighted than the peak generational year.

In the example shown in row 407, the user's cultural and geographic influences in column 403 can be generated based on direct user input, harvesting the user's social media data (e.g., referring to a user's social media timeline, etc.). The user's cultural or geographic influences in column 403 can be compared to assigned metadata in column 402 (e.g., cultural or geographical attributes, such as Christmas music or Irish music) to determine whether a match exists. A user affinity score in column 404 can be generated therefrom to represent the likelihood that the user has an affinity for the media track in column 401 based on the level of match between the user attributes in column 403 (e.g., lived in Ireland) with the cultural and geographic attributes in column 402 (e.g., Irish music). While the user's cultural and geographic influences in column 403 are shown in the same row 406, it should be appreciated that two can be separated into separate rows in other embodiments. Examples of the users cultural and geographic influences in column 403 can include, for example, a country where the user has lived, or currently lives. If multiple countries are applicable, then each country can be separated into its own row.

In the example shown in row 407, the user's life events in column 403 can be generated based on direct user input, harvesting the user's social media data (e.g., referring to a user's social media timeline, etc.). The user's life events in column 403 (e.g., wedding, graduation, attendance at a live musical performance, etc.) can be compared to assigned metadata in column 402 (e.g., user labeled song in a wedding or graduation playlist, etc.) to determine whether a match exists and to what extent. A user affinity score in column 404 can be generated therefrom to represent the likelihood that the user has an affinity for the media track in column 401 based on level of match between the user attributes in column 403 with the assigned metadata in column 402. In an embodiment, the user affinity score in column 404 for attending a live musical performance can be scored to reflect a strong likelihood that the user has an affinity for the media track.

In some instances, the user attribute in column 403 can include a related time period, such as the years the user lived in a country (e.g., geographic or cultural influence), or the year the user experienced a significant milestone or achievement in life (e.g., the year of a graduation or a wedding). In such case, the related year of the user attribute can be compared to the year of the user's peak affinity age to determine whether additional weighting can be applied, such as if the two years match or are within a predetermined time frame from each other.

In certain aspects, the playlist generator determines a pool of media tracks from the user's media tracks collection. In an embodiment, the metadata can be analyzed to determine a pool of media tracks that is available for playlist generation. For example, the metadata can be analyzed to identify any preferences or dislikes of the user (e.g., by a negative affinity score, user keyword indicating a dislike, direct user input etc.). In an embodiment, the preferences and dislikes for media tracks can be represented by scores and stored as metadata for media tracks. The media tracks with metadata indicating such dislikes can be eliminated. For example, if it is determined that the user dislikes heavy metal, then the media tracks with metadata relating to the genre of heavy metal can be eliminated from the pool. The attributes of the user's collection of media tracks can also be used to indicate user's preferences or dislikes. For example, a user preference for a media track can be indicated, for example, from: having a large amount of media tracks of certain type (e.g., lots of jazz tracks), frequent playing of a media track, etc. In an embodiment, the pool of media tracks can be selected based on temporal attributes, such as the time of year (or calendar year, such as only including Christmas music in the pool during Christmas season. In other embodiments, this operation can be optional or excluded.

The attributes of the user's collection of media tracks can also be used to indicate user preferences, such as an average (or mean) tempo of tracks in the library, median tempo, standard deviation of tempo, most common tempo, etc. For instance, if the most common tempo is 115 beats per minute (bpm), then songs with tempos near 115 bpm can be given a large score/weighting to indicate a strong preference. This can also apply to other metadata, such as the presence of genres, instrumentations, etc., in the library. For example, if lots of classical music (or lots of trumpet instrumentals), then the playlist generator can determine a likely preference for classical music and give a large score. An absence or very minimal number of tracks in a genre, for instance, may indicate a low affinity for that genre and thus given a low score for that genre. As another example, if the user has a lot of German music in his library (or none), then it can be determined that the user may have a strong preference for German music (or not), and thus German tracks can be scored accordingly.

In certain aspects, the playlist generator generates a playlist based on the user's condition and a target mood. For example, the playlist generator can determine the condition of the user and a target mood. In some instances, the target mood can be the same as the user's current mood and the playlist generator selects media tracks with mood categories that maintain the user's current mood. In another embodiment, the target mood is different than the user's current mood, and the playlist generator selects media tracks to transition from the user's current mood to the target mood. The user's current mood can be determined by direct user input of the user's mood, by user biorhythmic data, or both. The condition of the user can also include other user related information, such as the user's activity (e.g., running, resting, etc.), user's location (e.g., at work, at the gym, at a party, etc.), user's presence (e.g., in a conference call), social context (e.g., online with social contacts) etc. In an embodiment, this user related information can also be used to determine the user's current mood.

In certain aspects the playlist generator can select and order media tracks based on one or more progression formats. In an embodiment, a progression format can be selected to order media tracks in the playlist along a transitional path from the user's current mood to the target mood. Example progression formats can include a linear path (e.g., a vector), exponential path, or sawtooth path, with variable rates of change. The progression formats can be selected by the user, automatically selected, such as based on the user's condition. In another embodiment, there is only one progression format available and this default progression format is selected.

In an embodiment, playlist generation (PG) scores can be computed for the determined pool of media tracks that are available for playlist generation. The PG scores provide a system to select and order media tracks when generating a playlist based on the target mood and selected progression format. The personalized playlist can be generated based on the PG scores, selected progression format, and target mood. Media tracks can be ordered in the playlist based on their PG scores and how closely the PG scores align with the path of the progression format.

The PG score can be based on various mood related factors. For example, the PG score can be based on mood categories, a mood score, pacing level, etc., for a media track. The mood score can represent the level or degree of mood impact that the specific descriptive mood has, especially with respect to the target mood. For example, if the target mood is sad, then a media track given a score of 9 out of 10 for the "sad" mood category reflects a greater degree of sadness for the media track than say another media track given only a 3 out of 10 for the sad mood category. As another example, if the target mood is relaxing, then the term mellow may have a higher mood score than the term "sad", which may have a slow tempo but stronger impact of sadness that takes away the relaxing nature of the slow tempo. In such case, a media track having a mood score aligned closer to the progression format to the target mood can be selected for the playlist.

The PG scores can be based on the condition of the user, such as the users biorhythmic data, the user's activity (e.g., running, resting, etc.), the user's location (e.g., at work, at the gym, at a party, etc.), the user's presence (e.g., in a conference call), the user's social context (e.g., online with social media contacts) etc. For example, the detection of one or more of these conditions can be used to increase or decrease the PG scores accordingly depending on whether they align with the target mood and progression format.

The PG score can also take into account the user affinity scores computed in operation 605 for the generated user attributes (e.g., the user's peak affinity age, the user's peak generational year, the user's cultural and geographic influence, and the user's life events, etc.). For example, media tracks with relevant dates at or near the year of the user's peak affinity age can be weighted more heavily as they are associated with a strong likelihood of user affinity.

In an embodiment, the condition of the user and the PG scores can be updated dynamically and the playlist modified dynamically to reflect the updated PG scores. For example, a change in the condition of the user, such as the users biorhythmic data, the user's activity (e.g., running, resting, etc.), the user's location (e.g., at work, at the gym, at a party, etc.), the user's presence (e.g., in a conference call), the user's social context (e.g., online with social media contacts) etc., can change the user's current mood along the path of the progression format to the target mood. In such case, the order of the media tracks in the playlist (with or with new selections) can be modified based on the computed PG scores that more closely align with the path of the progression format. In an embodiment, the PG scores can be recomputed in such case based on the new conditions of the user and the appropriate media tracks selected to more closely align with the path of the progression format to the target mood. For example, if the updated condition of the user indicates that the user's biorhythmic data is greater than it should be based on the desired rate of change for the selected progression format, then the playlist can be modified with media tracks with PG scores to align the user's condition with the progression format.

In embodiments where the condition of the user (e.g., user's current mood) is used to determine the target mood and the playlist is designed to maintain the current condition (e.g., the user's current mood), then the changes in the condition of the user can change the target mood. In such case, new PG scores can be computed based on the new target mood, and the playlist can be dynamically modified accordingly.

Figure 5A:
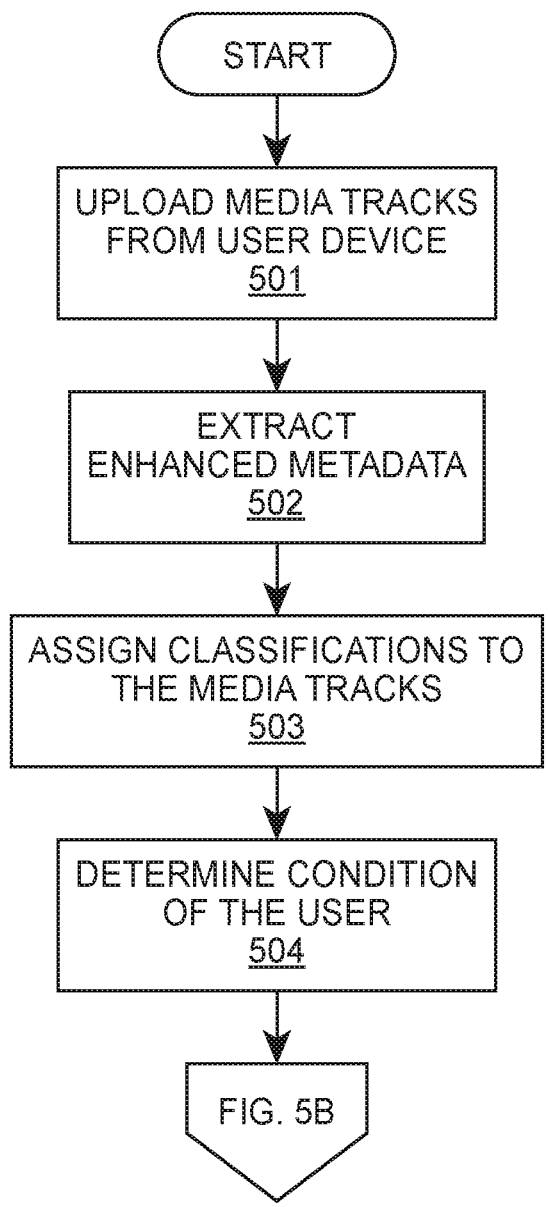
FIG. 5A illustrates an exemplary process for dynamically generating a personalized playlist, according to an embodiment.

FIG. 5A depicts an example embodiment of a process for dynamically generating a personalized playlist. Process 500 begins at operation 501 where media tracks are first uploaded from the users device. The media tracks are then analyzed and enhanced metadata is extracted therefrom (operation 502). At operation 503, one or more classifications are assigned to the media tracks. As described previously, embodiments include classifying the media tracks into mood categories or a numeric index representing pacing level of the media tracks. The user's condition is then determined at operation 504.

Figure 5B:
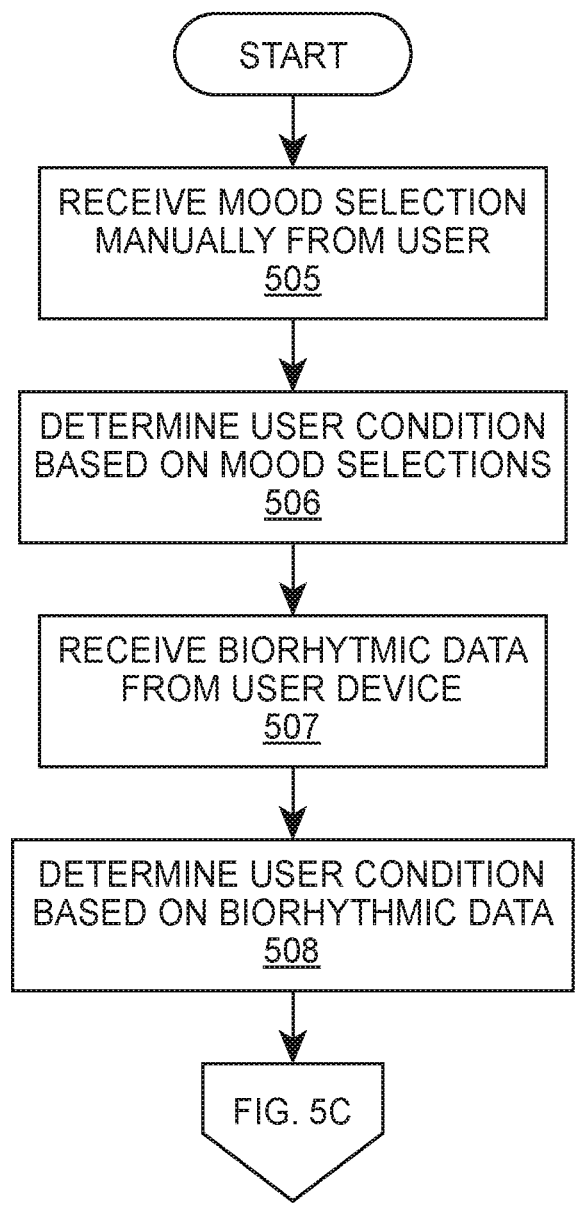
FIG. 5B illustrates an exemplary process for determining condition of a user for dynamic playlist generation, according to an embodiment.

The user's condition can be manually input by the user as a mood selection or group of mood selections, or it can be determined dynamically based on biorhythmic data of the user. Control of process 500 continues on FIG. 5B. At operation 505, mood selections are received manually from the user and are used to determine the user's condition (operation 506). At operation 507, biorhythmic data of the user is received from one or more of the user's electronic devices and is used to determine the user's condition (operation 508).

Figure 5C:
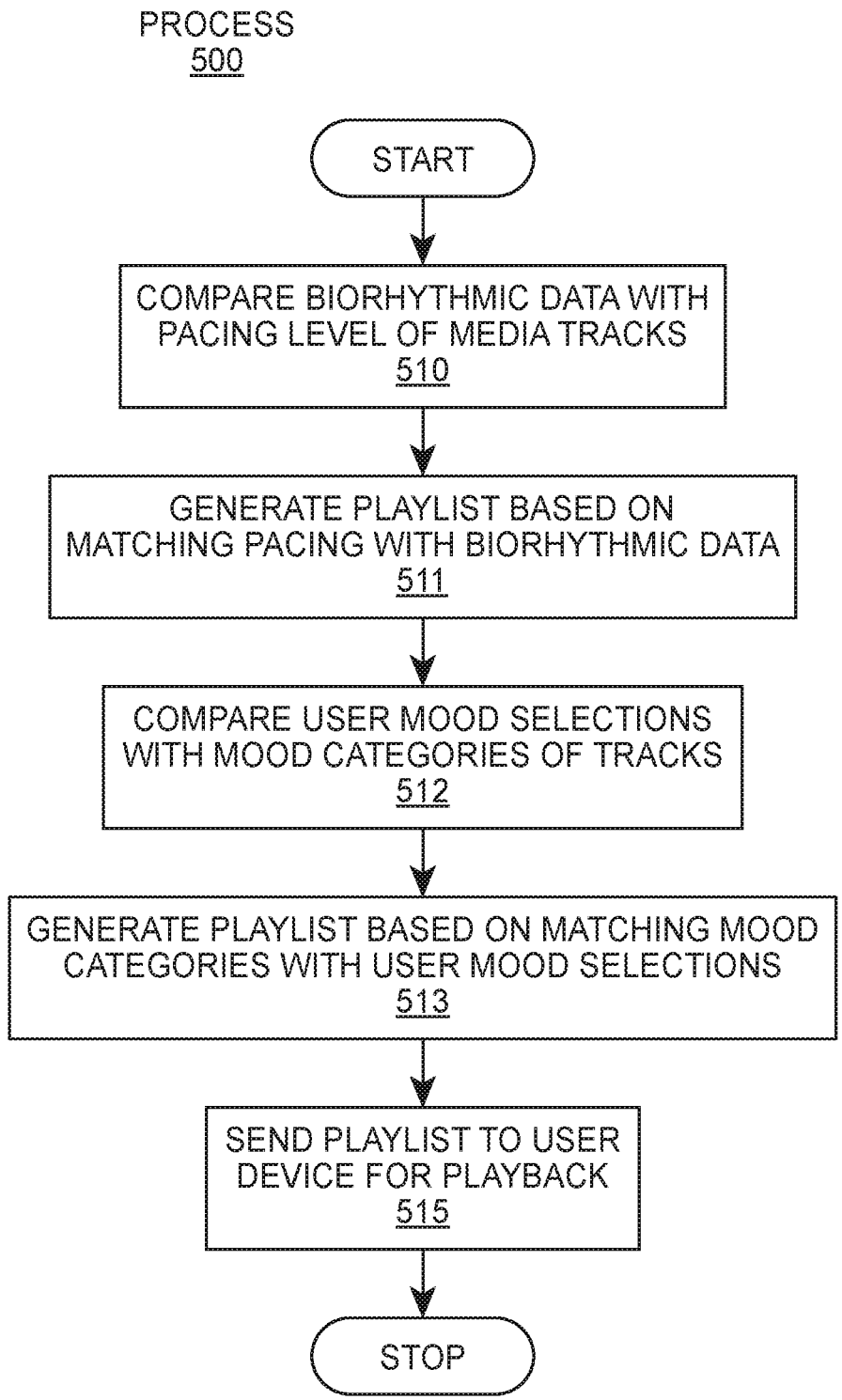
FIG. 5C illustrates an exemplary process for dynamically generating a personalized playlist, according to an embodiment.

Control of process 500 continues on FIG. 5C. One or more personalized playlists are generated based on the user's condition ascertained by the system. At operation 510, the user's biorhythmic data is compared with the pacing level of the media tracks and a playlist is generated based on matching the biorhythmic data with the pacing level (operation 511). At operation 512, the user's mood selections are compared to the mood categories associated with the media tracks and a playlist is generated based on matching the mood categories with the user mood selections (operation 513). The playlist can then be sent to the user's device or to a media player within the user's device for playback (operation 515). This completes process 500 according to one example embodiment.

There are many uses such a playlist generation system can be used for. In one case, it can be used as a dedicated device like a jukebox with a localized interface. The device can poll localized information such as user favorites and biorhythmic data and do a round-robin average of that data across everyone in the locality. The device could then generate a playlist based on that localized information just like a jukebox. Such a jukebox could have its own playlist or can generate a playlist based on harvesting user favorites data from the locality.

Figure 6:
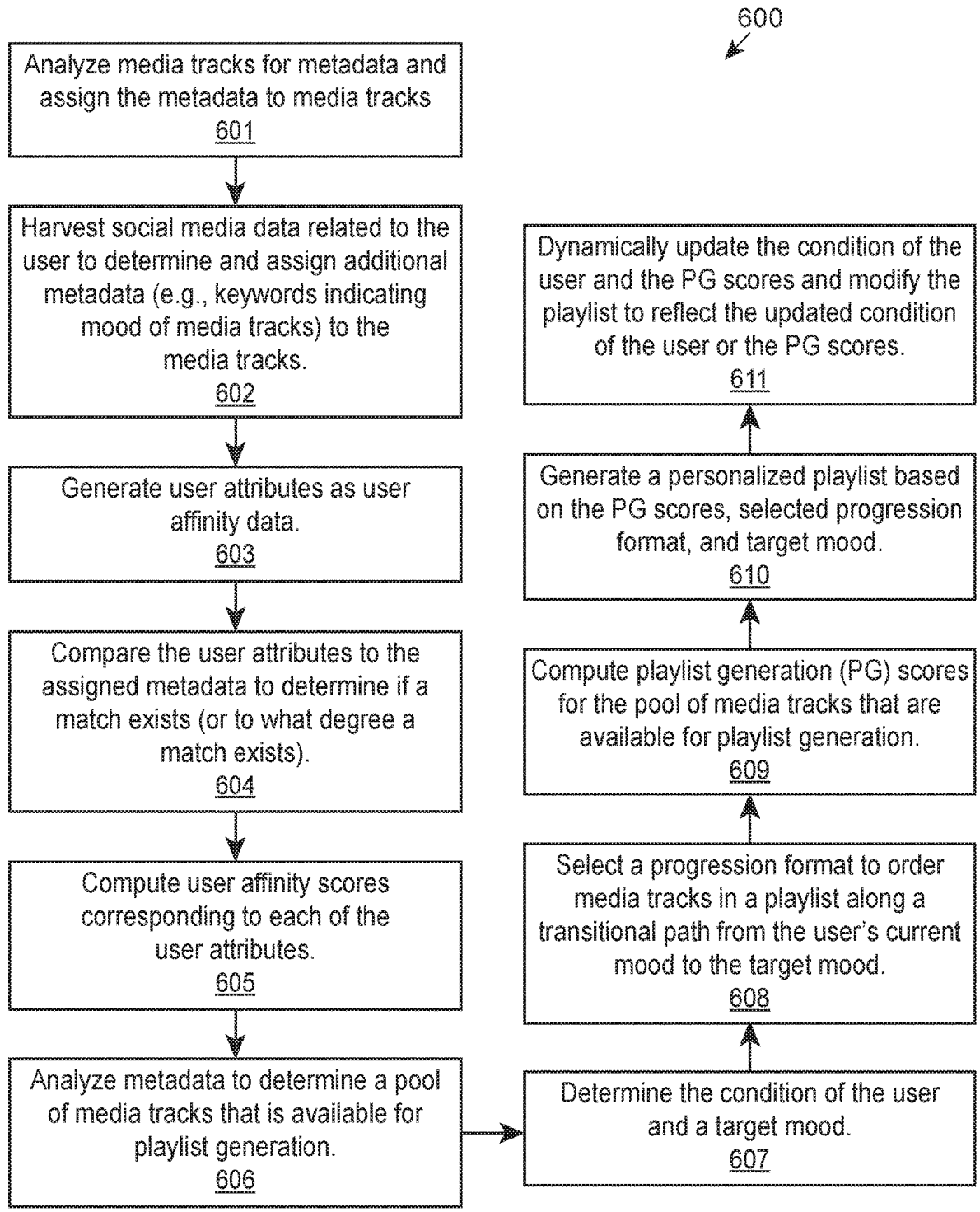
FIG. 6 illustrates an example embodiment of a process for dynamically generating a personalized playlist.

FIG. 6 depicts an example embodiment of a process for dynamically generating a personalized playlist. Process 600 begins at operation 601 where media tracks are analyzed for metadata and the metadata is assigned to the media tracks. For example, the media tracks can be uploaded from a user device of a user, and then analyzed for metadata (e.g., stored basic metadata and extracted enhanced metadata), which is then assigned to the media tracks. At operation 602, the user's social media data can be harvested to determine and assign additional metadata (e.g., keywords or synonyms of keywords indicating mood of media tracks) to the media tracks. At operation 603, user attributes are generated. This can include computing the user's peak affinity age, computing the user's peak generational year, determining the user's cultural and geographic influence, and determining the user's life events, for example. The user attributes are then compared to metadata that is assigned to each of the media tracks (operation 604) to determine if a match exists (or to what degree a match exists). At operation 605, user affinity scores corresponding to each of the user attributes are computed based on the comparison in operation 603. The user affinity scores for each user attribute can then be saved as additional metadata for the corresponding media tracks.

At operation 606, the metadata can be analyzed to determine a pool of media tracks that is available for playlist generation. For example, the metadata can be analyzed to identify any dislikes of the user (e.g., by a negative affinity score, user keyword indicating a dislike, direct user input etc.). The media tracks with metadata indicating such dislikes can be eliminated. For example, if it is determined that the user dislikes heavy metal, then the media tracks with metadata relating to the genre of heavy metal can be eliminated from the pool. The attributes of the user's collection of media tracks can also be used to indicate user's preferences or dislikes. For example, a user preference for a media track can be indicated, for example, from: having a large amount of media tracks of certain type (e.g., lots of jazz tracks), frequent playing of a media track, etc. In an embodiment, the pool of media tracks can be selected based on temporal attributes, such as the time of year (or calendar year, such as only including Christmas music in the pool during Christmas season. In other embodiments, this operation can be optional or excluded.

At operation 607, the condition of the user and a target mood are determined. In some instances, the target mood can represent the user's current mood and the playlist generator selects media tracks with mood categories that maintain the user's current mood. In another embodiment, the target mood is different than the user's current mood, and the playlist generator selects media tracks to transition from the user's current mood to the target mood. The user's current mood can be determined by direct user input of the user's mood, by user biorhythmic data, or both. The condition of the user can also include other user related information, such as the user's activity (e.g., running, resting, etc.), user's location (e.g., at work, at the gym, at a party, etc.), user's presence (e.g., in a conference call), social context (e.g., online with social contacts) etc.

At operation 608, a progression format is selected to order media tracks in the playlist along a transitional path from the user's current mood to the target mood. Example progression formats can include a linear path, exponential path, or sawtooth path, with variable rates of change. In another embodiment, there is only one progression available and this default progression format is selected.

At operation 609, playlist generation (PG) scores can be computed for the determined pool of media tracks that are available for playlist generation. The PG scores provide a system to select and order media tracks when generating a playlist based on the target mood and selected progression format. At operation 610, the personalized playlist is generated based on the PG scores, progression format, and target mood. Media tracks can be ordered in the playlist based on their PG scores and how closely the PG scores align with the path of the progression format.

The PG score can be based on various mood related factors. For example, the PG score can be based on mood categories, a mood score, pacing level, etc., for a media track. The mood score can represent the level or degree of mood impact that the specific descriptive mood has, especially with respect to the target mood. For example, if the target mood is sad, then a media track given a score of 9 out of 10 for the "sad" mood category reflects a greater degree of sadness for the media track than say another media track given only a 3 out of 10 for the sad mood category. As another example, if the target mood is relaxing, then the term mellow may have a higher mood score than the term "sad", which may have a slow tempo but stronger impact of sadness that takes away the relaxing nature of the slow tempo. In such case, a media track having a mood score aligned closer to the progression format to the target mood can be selected for the playlist.

The PG scores can be based on the condition of the user, such as the users biorhythmic data, the user's activity (e.g., running, resting, etc.), the user's location (e.g., at work, at the gym, at a party, etc.), the user's presence (e.g., in a conference call), the user's social context (e.g., online with social media contacts) etc. For example, the detection of one or more of these conditions can be used to increase or decrease the PG scores accordingly depending on whether they align with the target mood and progression format.

The PG score can also take into account the user affinity scores computed in operation 605 for the generated user attributes (e.g., the user's peak affinity age, the user's peak generational year, the user's cultural and geographic influence, and the user's life events, etc.). For example, media tracks with relevant dates at or near the year of the user's peak affinity age can be weighted more heavily as they are associated with a strong likelihood of user affinity.

At operation 611, the condition of the user and the PG scores are updated dynamically and the playlist modified dynamically to reflect the updated PG scores. For example, a change in the condition of the user, such as the users biorhythmic data, the user's activity (e.g., running, resting, etc.), the user's location (e.g., at work, at the gym, at a party, etc.), the user's presence (e.g., in a conference call), the user's social context (e.g., online with social media contacts) etc., can change the user's current mood along the path of the progression format to the target mood. In such case, the order of the media tracks in the playlist (with or with new selections) can be modified based on the computed PG scores that more closely align with the path of the progression format. In an embodiment, the PG scores can be recomputed in such case based on the new conditions of the user and the appropriate media tracks selected to more closely align with the path of the progression format to the target mood. For example, if the updated condition of the user indicates that the user's biorhythmic data is greater than it should be based on the desired rate of change for the selected progression format, then the playlist can be modified with media tracks with PG scores to align the user's condition with the progression format.

Figure 7:
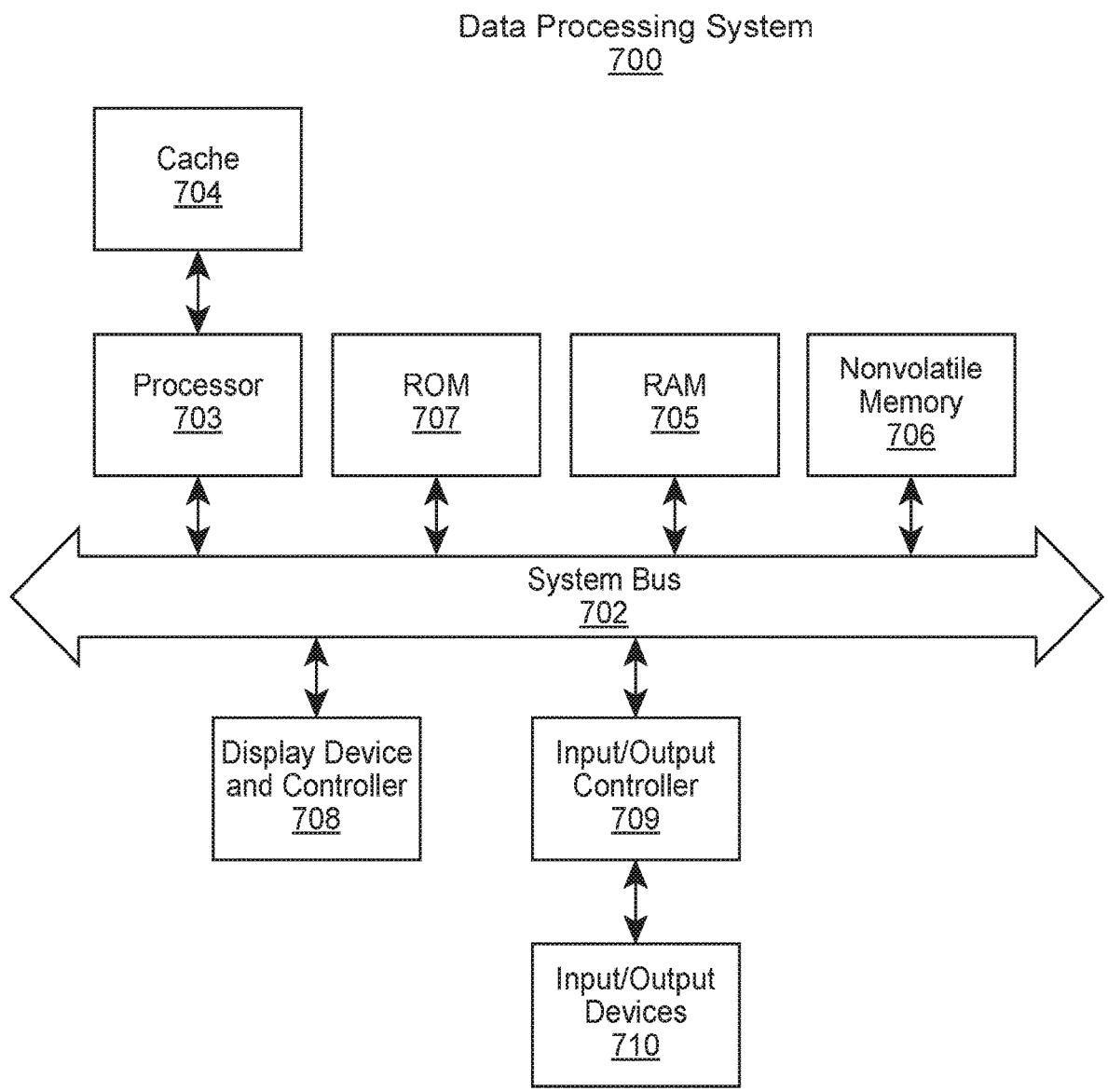
FIG. 7 illustrates a block diagram of an exemplary data processing system upon which the embodiments described herein can be implemented, according to an embodiment.

In embodiments where the condition of the user (e.g., user's current mood) is used to determine the target mood and the playlist is designed to maintain the current condition (e.g., the user's current mood), then the changes in the condition of the user can change the target mood. In such case, new PG scores can be computed based on the new target mood, and the playlist can be dynamically modified accordingly. FIG. 7 depicts an example data processing system upon which the embodiments described herein may be implemented. As shown in FIG. 6, the data processing system 701 includes a system bus 702, which is coupled to a processor 703, a Read-Only Memory ("ROM") 707, a Random Access Memory ("RAM") 705, as well as other nonvolatile memory 706, e.g., a hard drive. In the illustrated embodiment, processor 703 is coupled to a cache memory 704. System bus 702 can be adapted to interconnect these various components together and also interconnect components 703, 707, 705, and 706 to a display controller and display device 708, and to peripheral devices such as input/output ("I/O") devices 710. Types of I/O devices can include keyboards, modems, network interfaces, printers, scanners, video cameras, or other devices well known in the art. Typically, I/O devices 710 are coupled to the system bus 702 through I/O controllers 709. In an embodiment the I/O controller 709 includes a Universal Serial Bus ("USB") adapter for controlling USB peripherals or other type of bus adapter.

RAM 705 can be implemented as dynamic RAM ("DRAM"), which requires power continually in order to refresh or maintain the data in the memory. The other nonvolatile memory 706 can be a magnetic hard drive, magnetic optical drive, optical drive, DVD RAM, or other type of memory system that maintains data after power is removed from the system. While FIG. 7 shows that nonvolatile memory 706 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments could employ various computer-implemented functions involving data stored in a computer system. The techniques may be carried out in a computer system or other data processing system in response executing sequences of instructions stored in memory. In various embodiments, hardwired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other data processing system such as data processing system 600, are adapted to cause the system to perform operations according to the techniques described herein. Computer-readable media can include any mechanism that stores information in a form accessible by a data processing device such as a computer, network device, tablet, smartphone, or any device having similar functionality.

Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format.

Computer-readable media can also be distributed over a network-coupled computer system stored and executed in a distributed fashion.

It should be understood that the various data processing devices and systems are provided for illustrative purposes only, and are not intended to represent any particular architecture or manner of interconnecting components, as such details are not germane to the techniques described herein. It will be appreciated that network computers and other data processing systems, which have fewer components or perhaps more components, may also be used. For instance, these embodiments may be practiced with a wide range of computer system configurations including any device that can interact with the Internet via a web browser or an application such as hand-held devices, microprocessor systems, workstations, personal computers ("PCs"), Macintosh computers, programmable consumer electronics, minicomputers, mainframe computers, or any mobile communications device including an iPhone, iPad, Android, or Blackberry device, or any device having similar functionality. These embodiments can also be practiced in distributed computing environments where tasks are performed by remote processing devices that are linked through a wire-based or wireless network.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims that follow as well as the legal equivalents thereof.

What is claimed is:

1. A computer-implemented method of generating a playlist comprising:
    receiving, by a computer, a plurality of media tracks from a user device of a user;
    analyzing, by the computer, the plurality of media tracks for metadata and assigning the metadata to the media tracks in the plurality of media tracks;
    generating, by the computer, one or more user attributes of the user, wherein the one or more user attributes comprises a first time period of a peak affinity age of the user, wherein the peak affinity age of the user is an age or range of ages of the user between 20 and 30 years old, and wherein the generating of the one or more user attributes of the user comprises determining the first time period of the peak affinity age of the user;
    comparing, by the computer, the metadata of the media tracks to the one or more user attributes, wherein the metadata comprises metadata for relevant dates of media tracks, wherein the relevant dates of the media tracks comprise a date of performance of the media tracks, and wherein the comparing of the metadata of the media tracks to the one or more user attributes comprises comparing the relevant dates of the media tracks to the first time period of the peak affinity age of the user;
    determining, by the computer, a target mood for generating a playlist; and
    generating, by the computer, a playlist based on the target mood and based on the comparison of the metadata to the one or more attributes, wherein the generating of the playlist is based on the comparison of the relevant dates of the media tracks to the first time period of the peak affinity age of the user.

2. The computer-implemented method of claim 1, further comprising:
    selecting a progression format for ordering the media tracks in the playlist, wherein the generating of the playlist is based on the progression format; and
    computing, by the computer, one or more first scores based on the comparison of the metadata and the user attributes, wherein the one or more first scores comprises a score that is computed based on the comparison of the relevant dates of the media tracks to the first time period of the peak affinity age of the user, wherein the generating of the playlist is based on the progression format and the one or more first scores.

3. The computer-implemented method of claim 2, wherein the one or more first scores comprises a score that is based on at least one selected from the group consisting of: mood category, mood score, and pacing level.

4. The computer-implemented method of claim 2, further comprising determining a condition of the user, wherein the one or more first scores comprises a score that is based on the condition of the user, wherein the condition of the user comprises at least one selected from the group consisting of: a user activity, a user location, a user presence, and a user social context.

5. The computer-implemented method of claim 4, wherein the one or more first scores comprises a score that is based on at least one selected from the group consisting of: mood category, mood score, and pacing level.

6. The computer-implemented method of claim 2, wherein the generating of the playlist comprises selecting and ordering media tracks based on the progression format, and wherein the ordering of the media tracks based on the progression format is weighted based on the one or more first scores.

7. The computer-implemented method of claim 1, further comprising:
    computing, by the computer, one or more first scores based on the comparison of the metadata and the user attributes, wherein the one or more first scores comprises a score that is computed based on the comparison of the relevant dates of the media tracks to the first time period of the peak affinity age of the user; and
    analyzing, by the computer, the metadata to determine a pool of media tracks that are available for playlist generation, wherein the generating of the playlist is based on the progression format and the one or more first scores, and wherein the playlist is generated from the pool of media tracks.

8. The computer-implemented method of claim 1, further comprising:
    determining a condition of the user, wherein the condition of the user comprises a current mood of the user;
    selecting a progression format; and
    ordering, by the computer, media tracks along a path from the current mood to the target mood based on the progression format;
    wherein the generating of the playlist comprises selecting and ordering media tracks based on the progression format.

9. The computer-implemented method of claim 8, further comprising:
    updating the condition of the user and dynamically modifying the playlist, wherein the condition of the user comprises user biorhythmic data; and
    sending the modified personalized playlist for play on the user device.

10. The computer-implemented method of claim 1, further comprising determining a condition of the user, wherein the condition of the user comprises a current mood of the user and biorhythmic data of the user, and wherein the current mood of the user is the target mood, and wherein the generating of the personalized playlist is based on the determined condition of the user.

11. The computer-implemented method of claim 1, wherein the peak affinity age of the user is an age between 22 and 28, and wherein the first time period of the peak affinity age of the user is a year when the user is the age between 22 and 28.

12. The computer-implemented method of claim 1, wherein the one or more user attributes comprises a peak generational year of the user, wherein the peak generational year of the user is a second time period that is within 20 to 30 years prior to the first time period of the peak affinity age of the user, and wherein the relevant dates of the media tracks comprise a date of performance of the media tracks, and wherein the relevant dates of the media tracks are compared to the second time period.

13. The computer-implemented method of claim 1, wherein the one or more user attributes comprises attributes related to culture or geography, and wherein the metadata comprises metadata related to culture or geography, and wherein the metadata related to culture or geography is compared to the attributes related to culture or geography.

14. The computer-implemented method of claim 1, wherein the one or more user attributes comprises attributes related to a life event experience by the user, and wherein the metadata comprises metadata related to the life event, and wherein the metadata related to the life event is compared to the attributes related to the life event.

15. A system comprising:
a processor;
a memory containing instructions that, when executed, cause the processor to:
receive a plurality of media tracks from a user device of a user;
analyze the plurality of media tracks for metadata and assign the metadata to the media tracks in the plurality of media tracks;
generate one or more user attributes of the user, wherein the one or more user attributes comprises a first time period of a peak affinity age of the user, wherein the peak affinity age of the user is an age or range of ages of the user between 20 and 30 years old, and wherein the generating of the one or more user attributes of the user comprises determining the first time period of the peak affinity age of the user;
compare the metadata of the media tracks to the one or more user attributes, wherein the metadata comprises metadata for relevant dates of media tracks, wherein the relevant dates of the media tracks comprise a date of performance of the media tracks, and wherein the comparing of the metadata of the media tracks to the one or more user attributes comprises comparing the relevant dates of the media tracks to the first time period of the peak affinity age of the user;
determine a target mood for generating a playlist; and
generate a playlist based on the target mood and based on the comparison of the metadata to the one or more attributes, wherein the generating of the playlist is based on the comparison of the relevant dates of the media tracks to the first time period of the peak affinity age of the user.

16. The system of claim 15, wherein the instructions further cause the processor to:
select a progression format for ordering the media tracks in the playlist, wherein the generating of the playlist is based on the progression format; and
compute one or more first scores based on the comparison of the metadata and the user attributes, wherein the one or more first scores comprises a score that is computed based on the comparison of the relevant dates of the media tracks to the first time period of the peak affinity age of the user, wherein the generating of the playlist is based on the progression format and the one or more first scores.

17. The system of claim 16, wherein the instructions further cause the processor to determine a condition of the user, wherein the one or more first scores comprises a score that is based on the condition of the user, wherein the condition of the user comprises at least one selected from the group consisting of: a user activity, a user location, a user presence, and a user social context, and wherein the one or more first scores comprise a score that is based on at least one selected from the group consisting of: mood category, mood score, and pacing level.

18. The system of claim 15, wherein the instructions further cause the processor to:
compute one or more first scores based on the comparison of the metadata and the user attributes, wherein the one or more first scores comprises a score that is computed based on the comparison of the relevant dates of the media tracks to the first time period of the peak affinity age of the user; and
analyze the metadata to determine a pool of media tracks that are available for playlist generation, wherein the generating of the playlist is based on the progression format and the one or more first scores, and wherein the playlist is generated from the pool of media tracks;
wherein the generating of the playlist comprises selecting and ordering media tracks based on the progression format, and wherein the ordering of the media tracks based on the progression format is weighted based on the one or more first scores.

19. The system of claim 15, wherein the instructions further cause the processor to:
determine a condition of the user, wherein the condition of the user comprises a current mood of the user and biorhythmic data for the user;
select a progression format and order media tracks along a path from the current mood to the target mood based on the progression format;
wherein the generating of the playlist comprises selecting and ordering media tracks based on the progression format;
update the condition of the user and dynamically modify the playlist, wherein the condition of the user comprises user biorhythmic data; and
send the modified personalized playlist for play on the user device;
wherein the peak affinity age of the user is an age between 22 and 28, and wherein the first time period of the peak affinity age of the user is a year when the user is the age between 22 and 28.

20. The system of claim 15, wherein the one or more user attributes comprises a peak generational year of the user, wherein the peak generational year of the user is a second time period that is within 20 to 30 years prior to the first time period of the peak affinity age of the user;

wherein the relevant dates of the media tracks comprise a date of performance of the media tracks, and wherein the relevant dates of the media tracks are compared to the second time period;

wherein the one or more user attributes comprises attributes related to culture or geography, and wherein the metadata comprises metadata related to culture or geography;

wherein the metadata related to culture or geography is compared to the attributes related to culture or geography;

wherein the one or more user attributes comprises attributes related to a life event experience by the user; and wherein the metadata comprises metadata related to the life event, and wherein the metadata related to the life event is compared to the attributes related to the life event.

21. The system of claim 15, wherein the determining of the peak affinity age for the user comprises:

determining a current age of the user from direct user input or harvesting social media data for the user; and computing the first time period of the peak affinity age of the user based on the determined current age of the user.

* * * * *